United States Patent [19]

Baichtal

[11] 4,195,206
[45] Mar. 25, 1980

[54] PATH TEST APPARATUS AND METHOD

[75] Inventor: James R. Baichtal, Las Altos, Calif.

[73] Assignee: TRW, Inc., Los Angeles, Calif.

[21] Appl. No.: 954,780

[22] Filed: Oct. 26, 1978

Related U.S. Application Data

[63] Continuation of Ser. No. 762,934, Jan. 26, 1977, abandoned.

[51] Int. Cl.² ............................................. H04J 3/14
[52] U.S. Cl. ..................................................... 370/14
[58] Field of Search ......... 179/15 BF, 15 AL, 15 AT

[56] References Cited

U.S. PATENT DOCUMENTS 3,959,594  5/1976  Srivastava ..................... 179/15 AL
4,048,445  9/1979  Ghisler ............................ 179/15 BF Primary Examiner—David L. Stewart
Attorney, Agent, or Firm—Flehr, Hohbach, Test

[57] ABSTRACT

Path test apparatus and a method for verifying the continuity of a data path in a telephone system between an input portion and an output portion of a telephone interface which receives and transmits telephone signals where the telephone system operates in time frames each consisting of a plurality of time slots. The apparatus includes a signal generator which connects a test signal to a selected time slot in said input portion. Means are provided for connecting a data path between a time slot in the input portion and a time slot in the output portion whereby the test signal occurs in the output portion. Means are provided for detecting the test signal in the output portion, thereby verifying the continuity of the data path.

12 Claims, 17 Drawing Figures

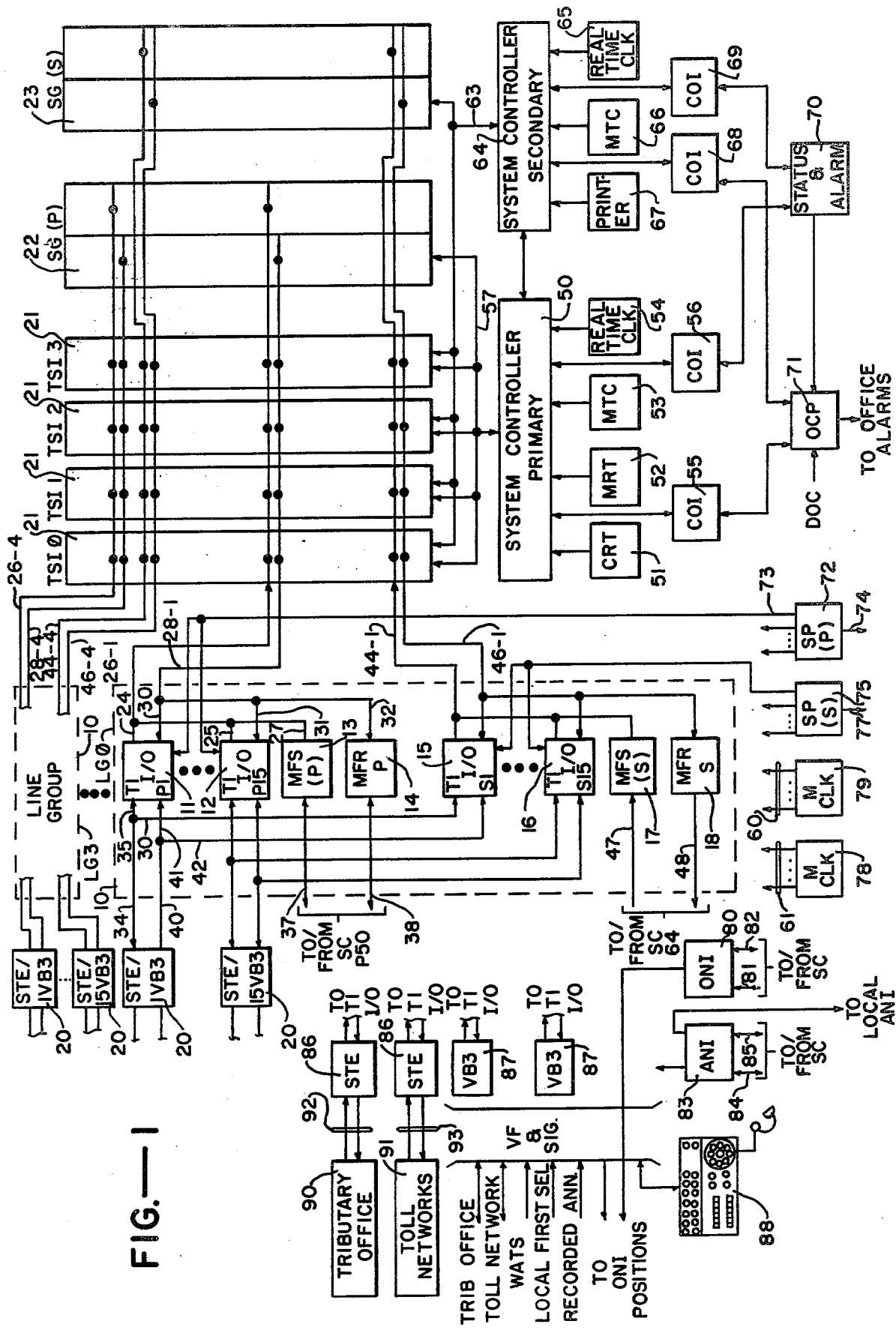

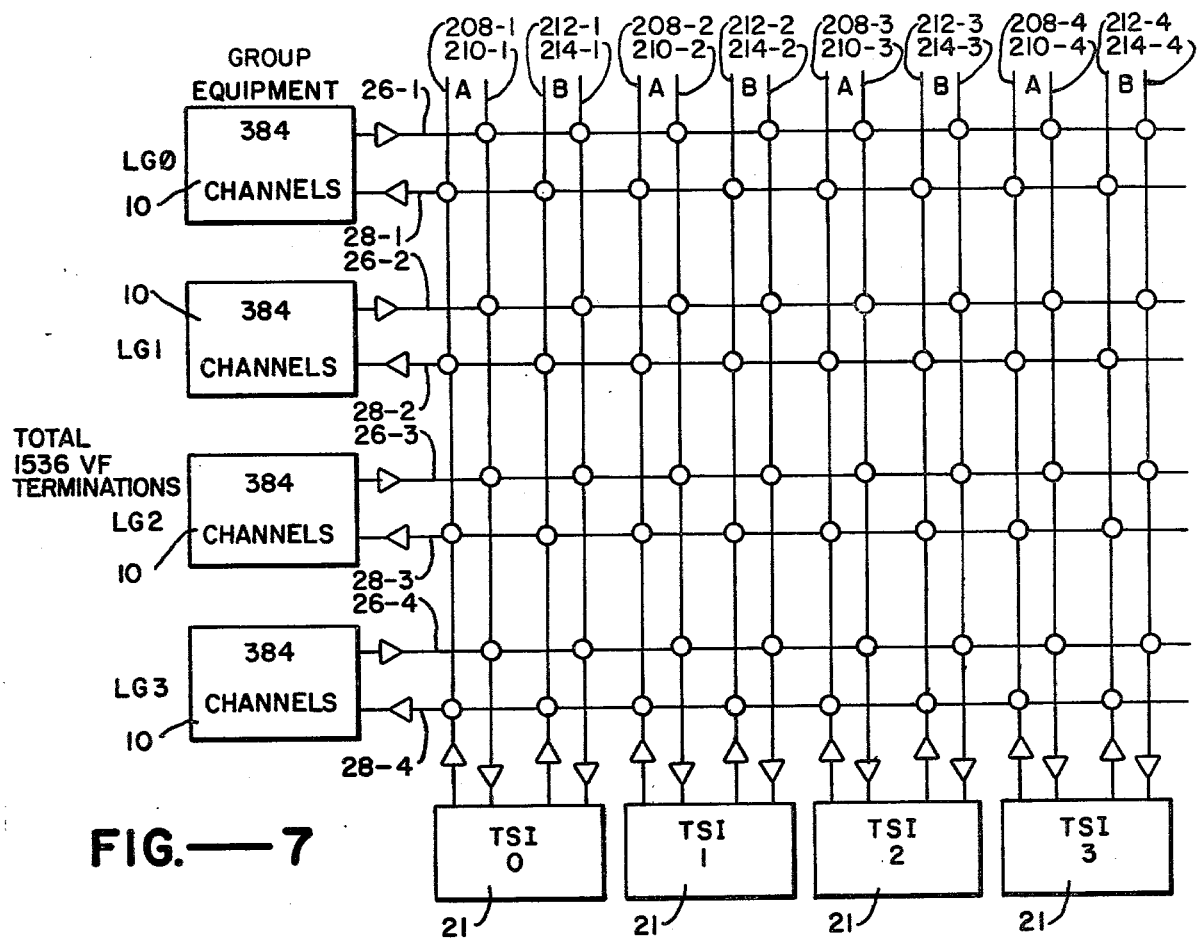
FIG.—7
FIG.—2
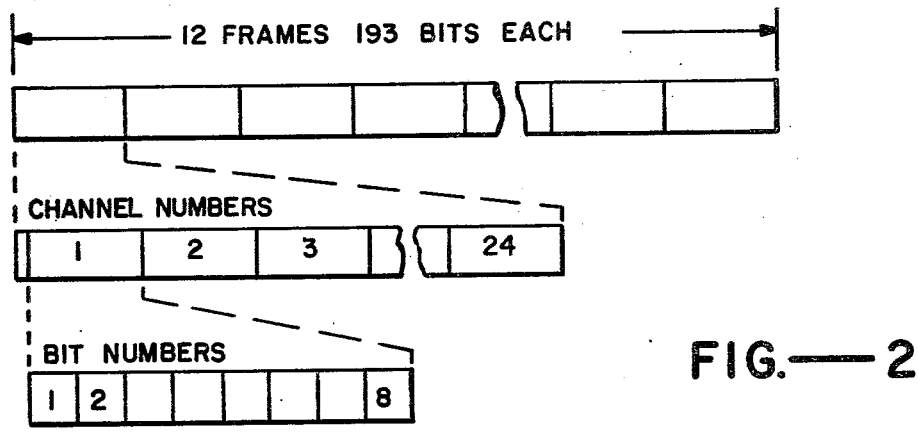
FIG.—3

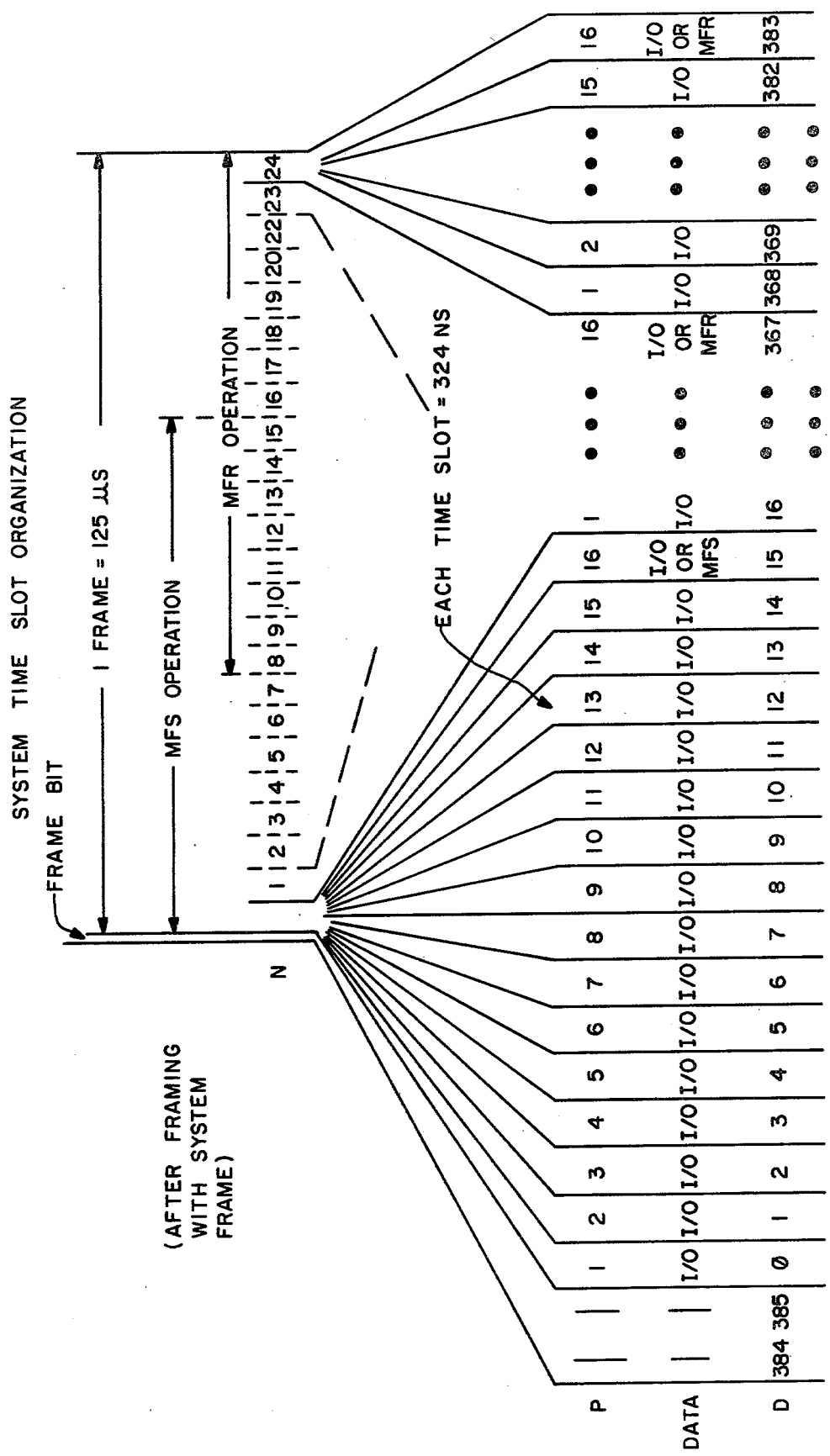
FIG.—4

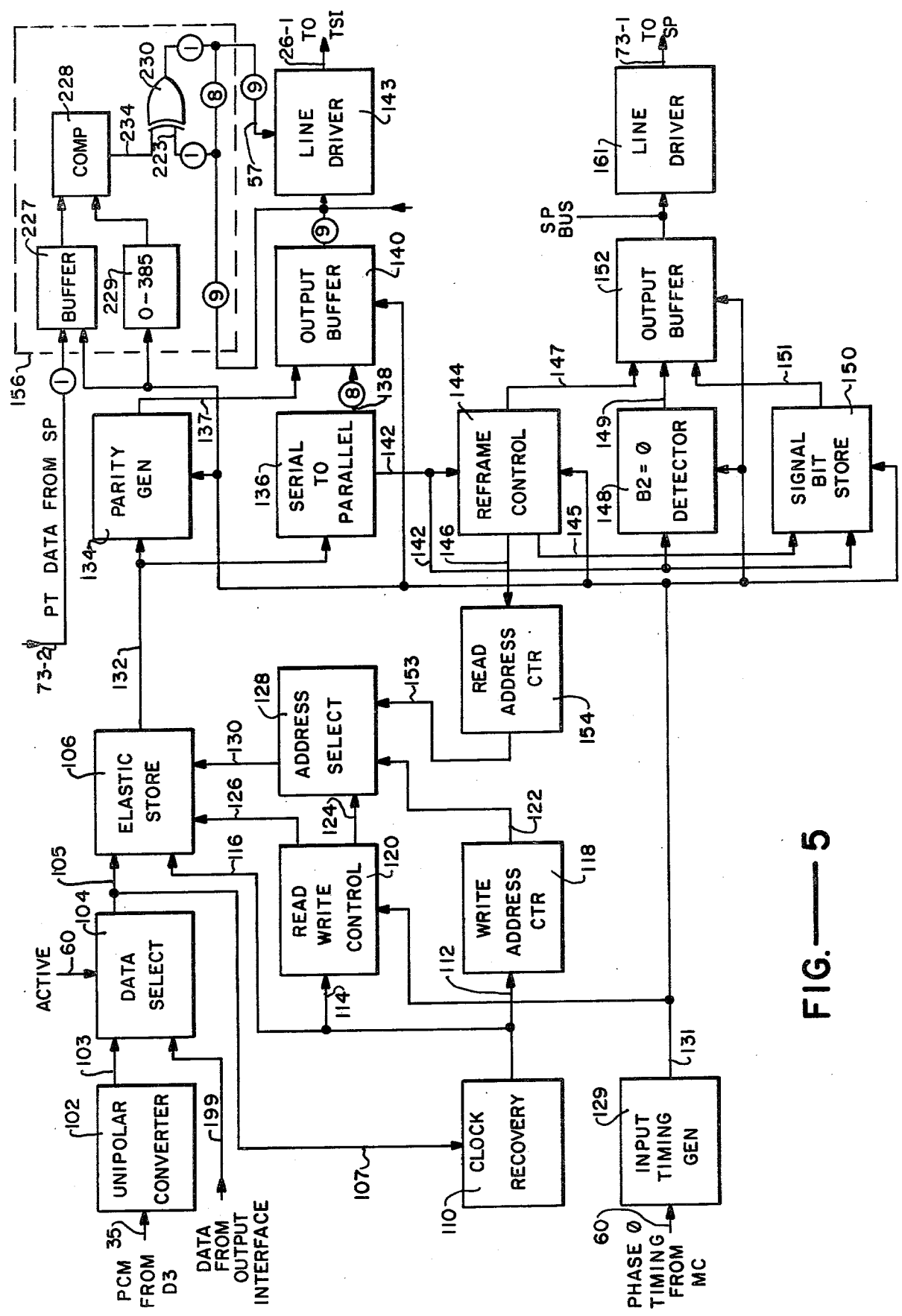
FIG.—5

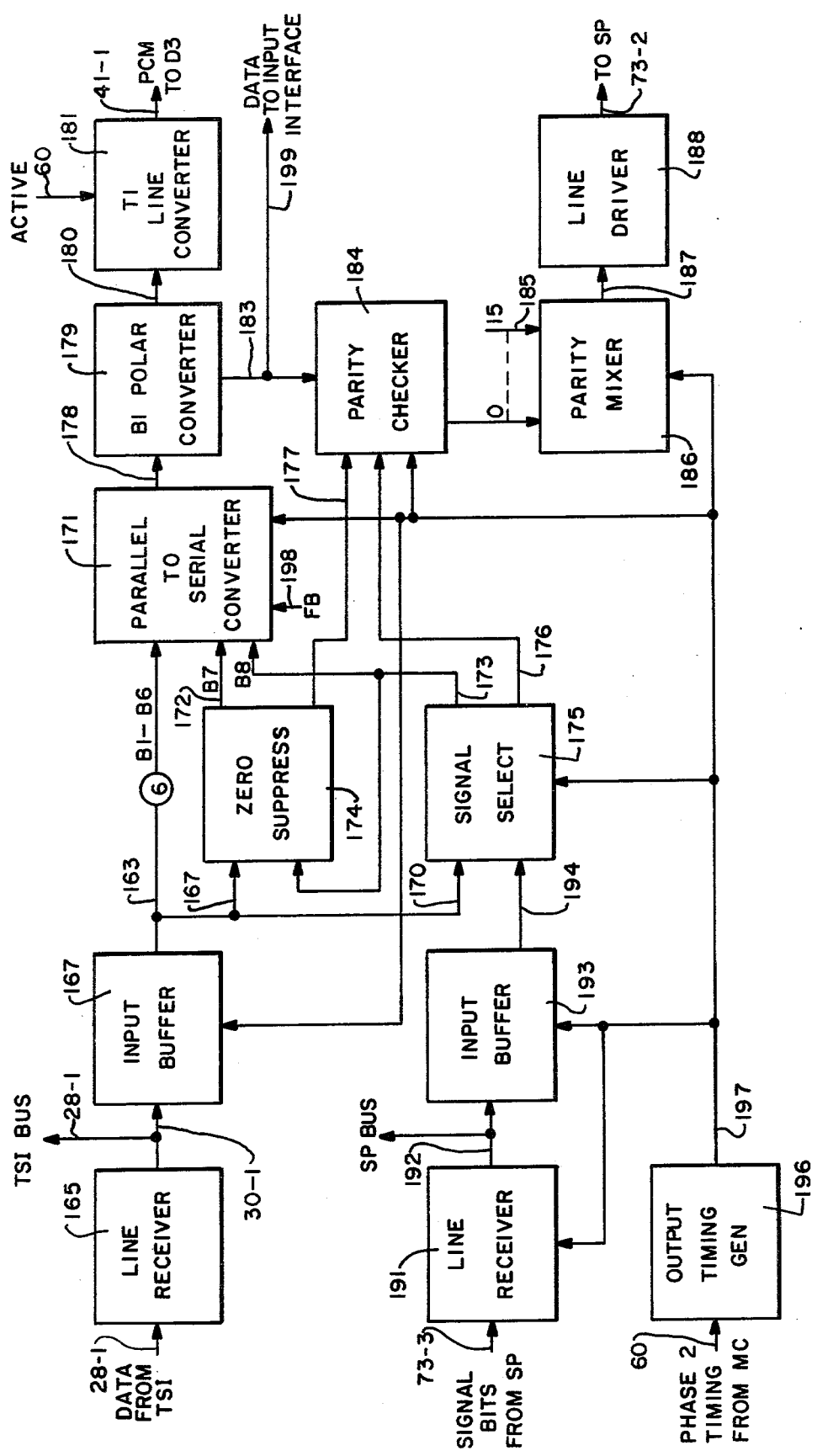
FIG.—6

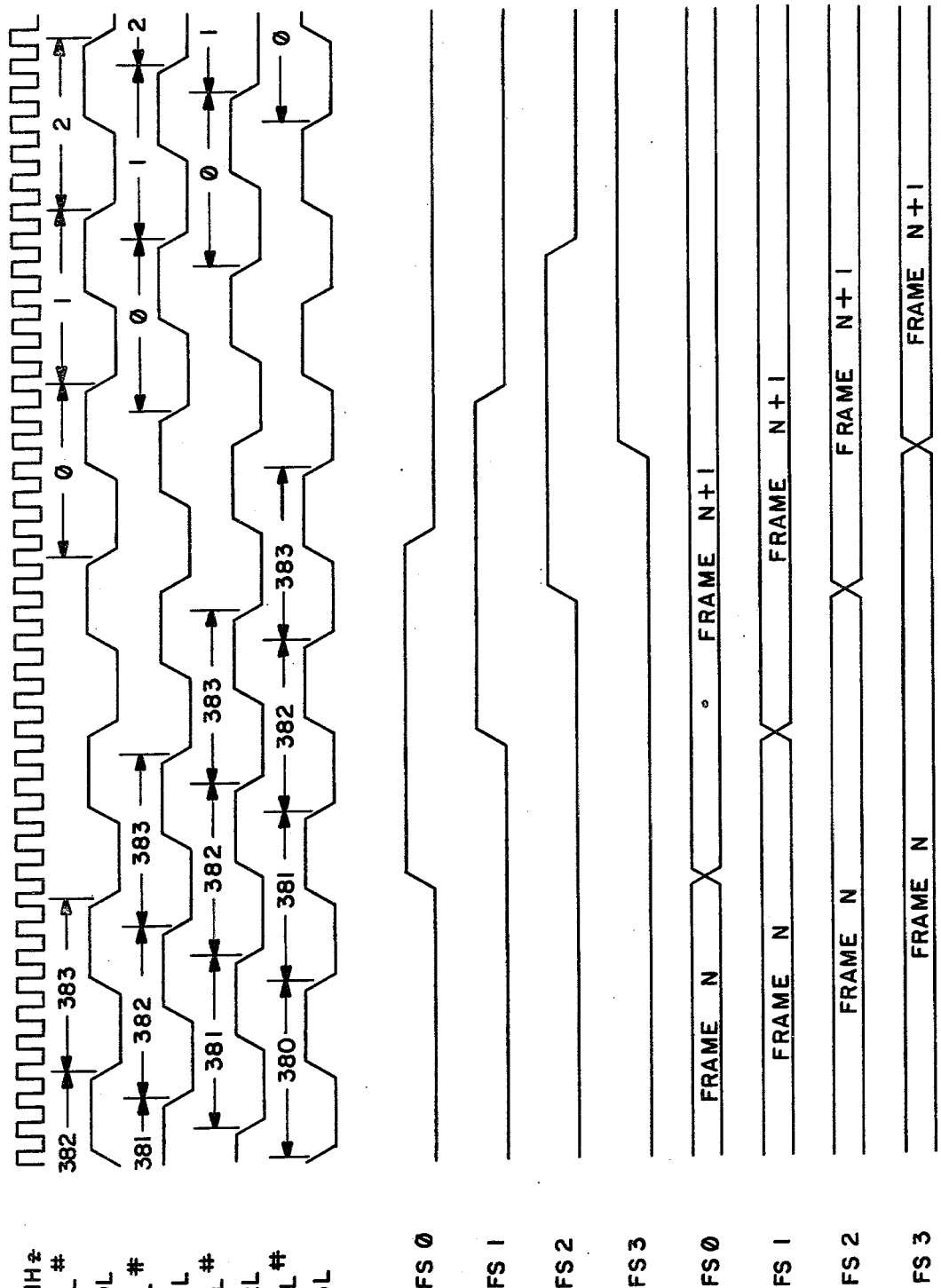
FIG.—8

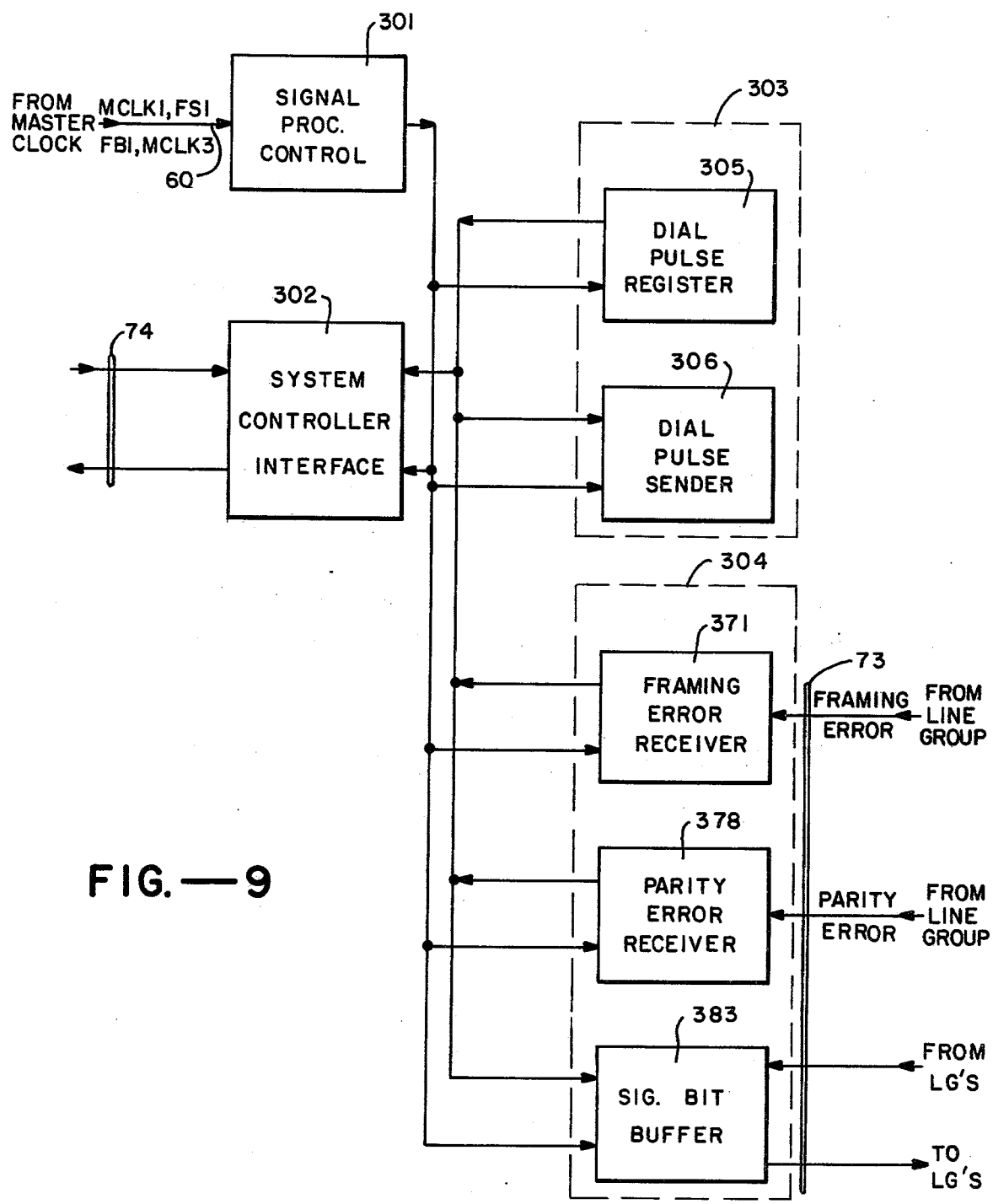
FIG.—9

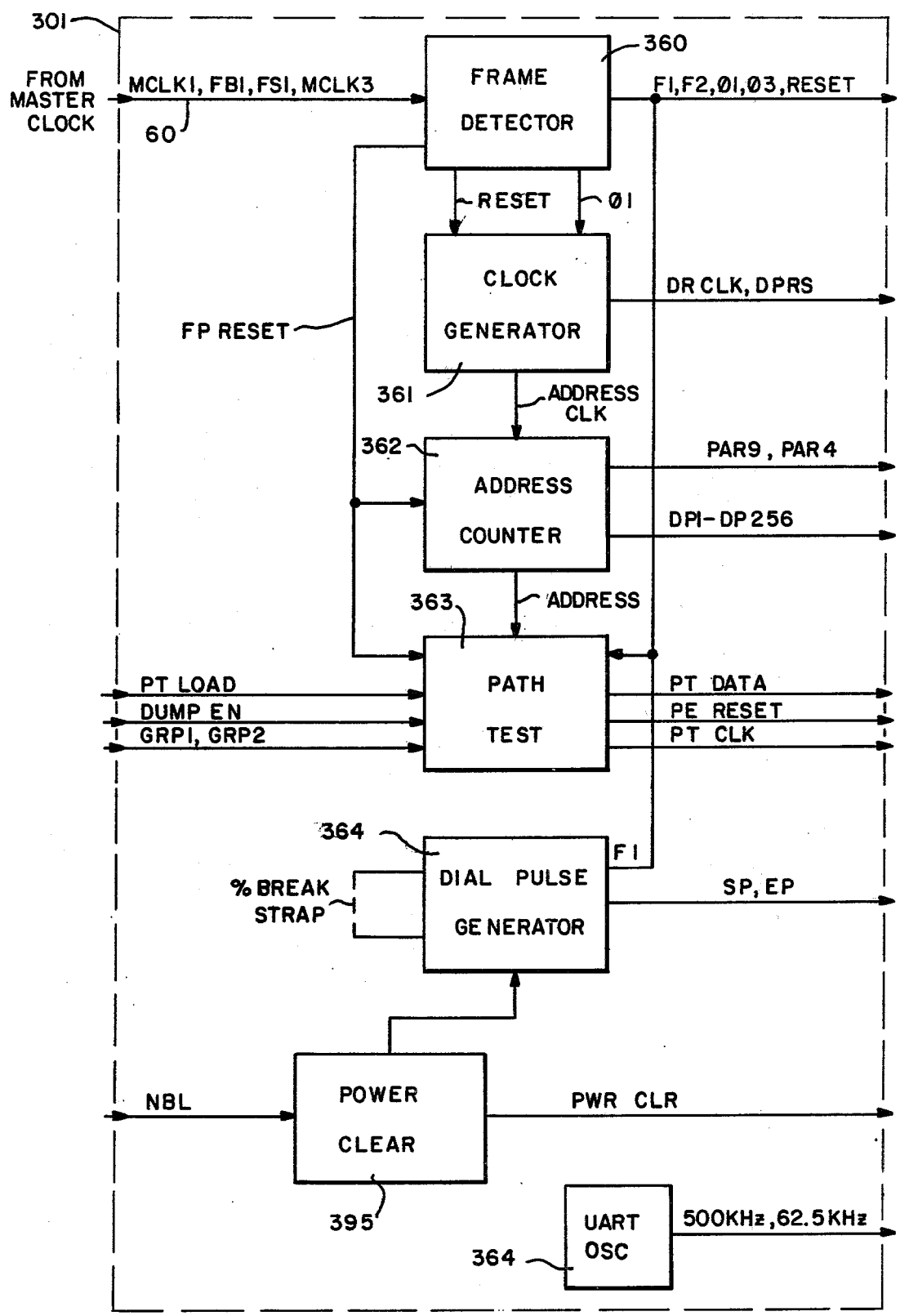
FIG.—10

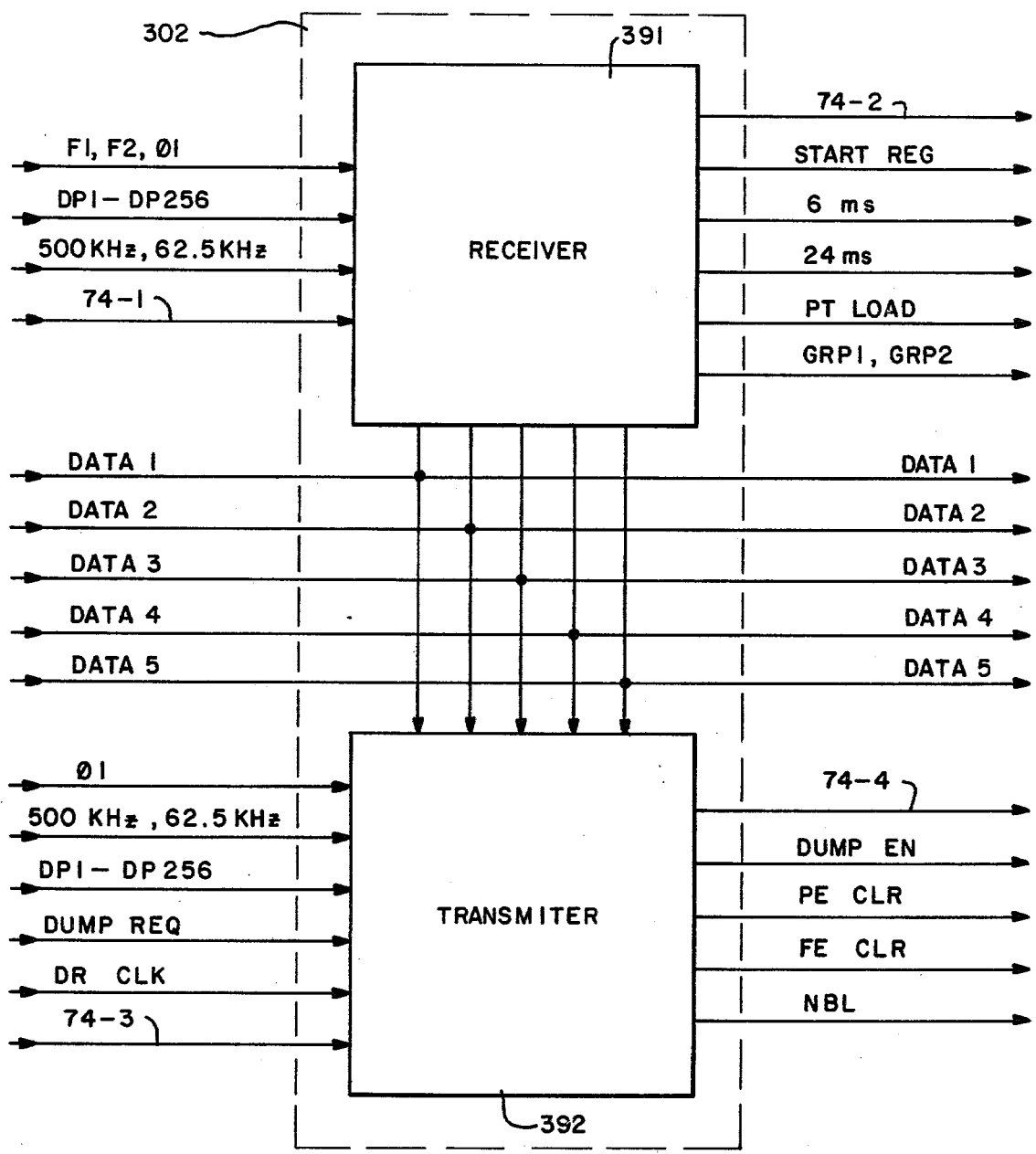
FIG.—11

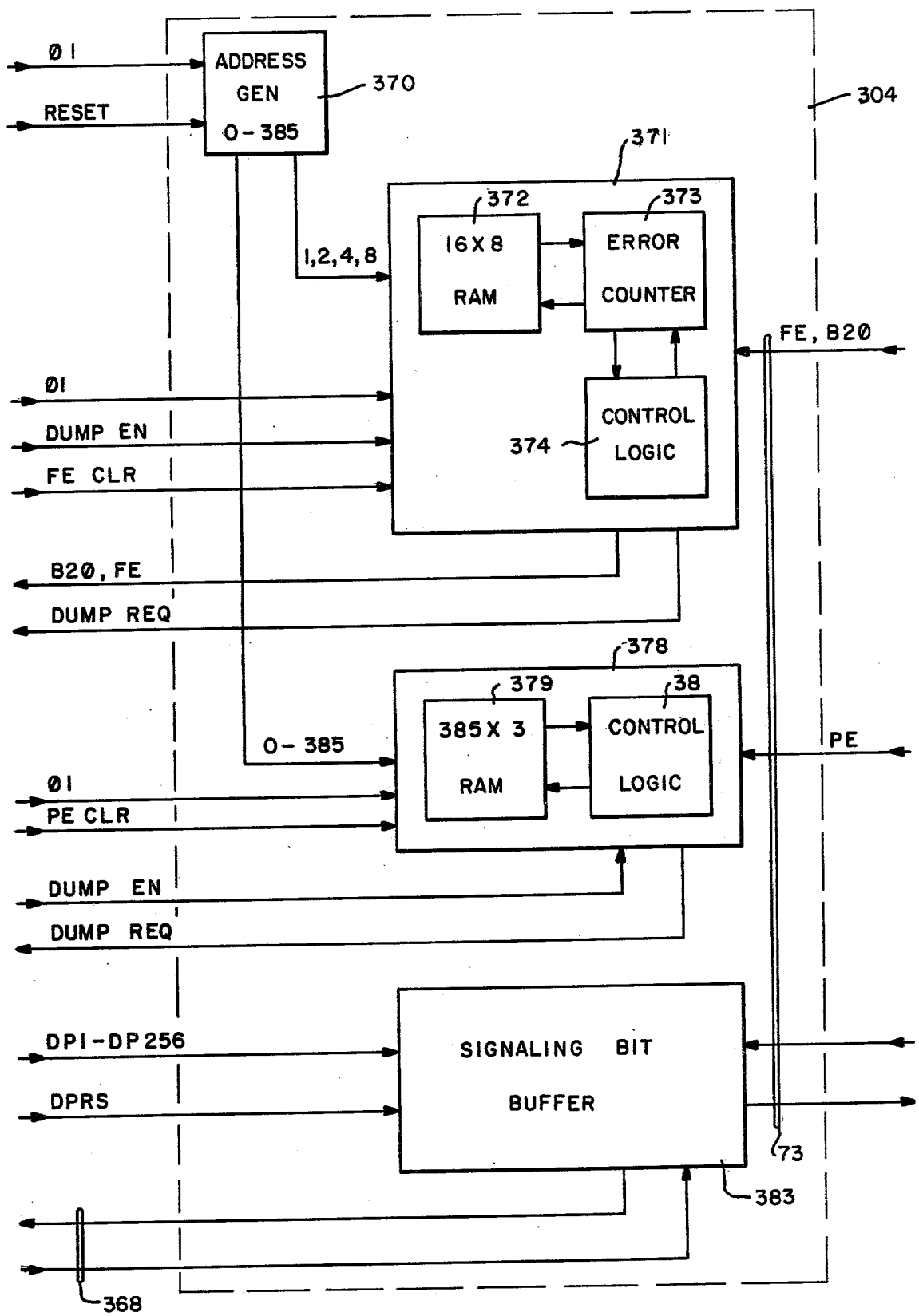
FIG.—12

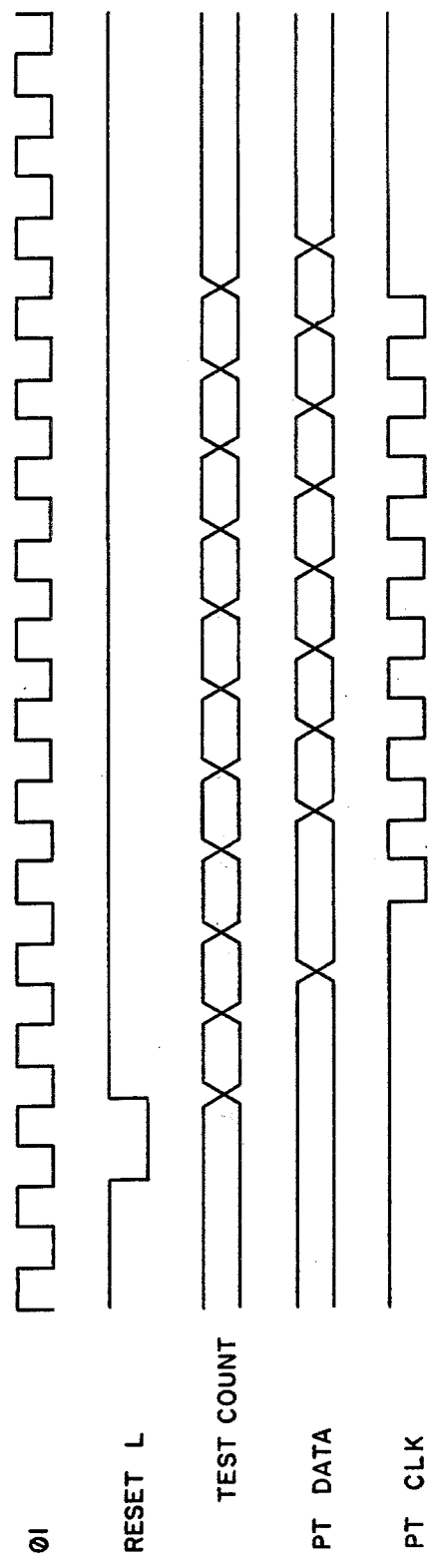
FIG.—15
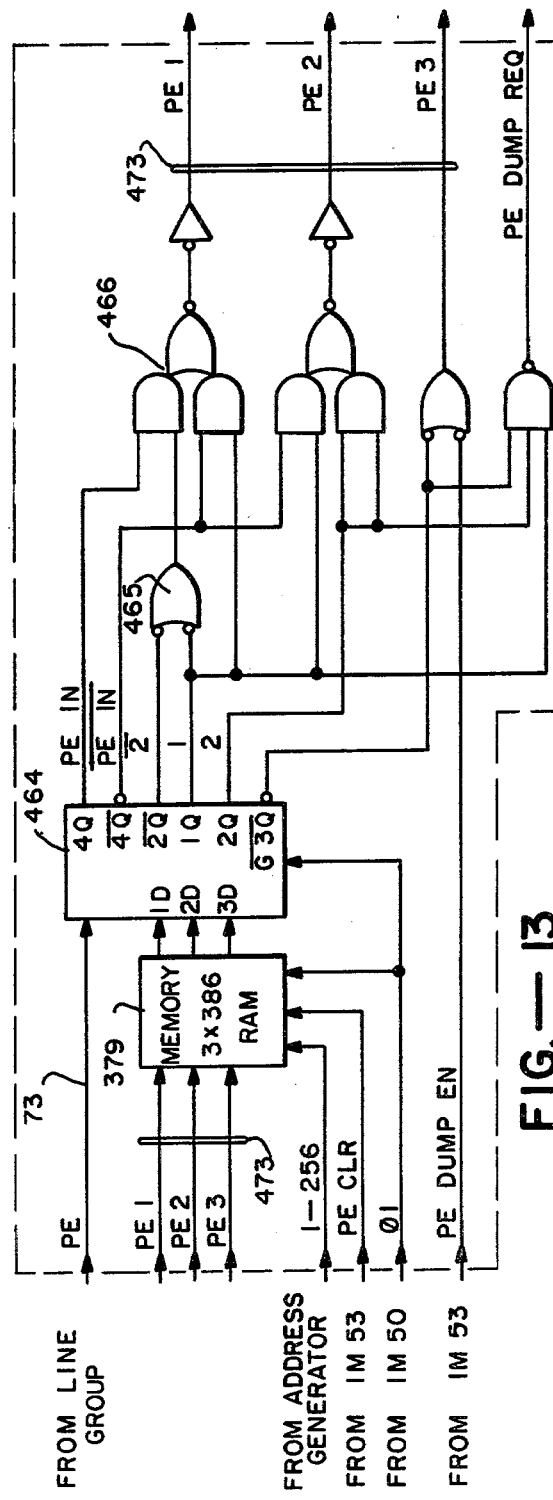
FIG.—13

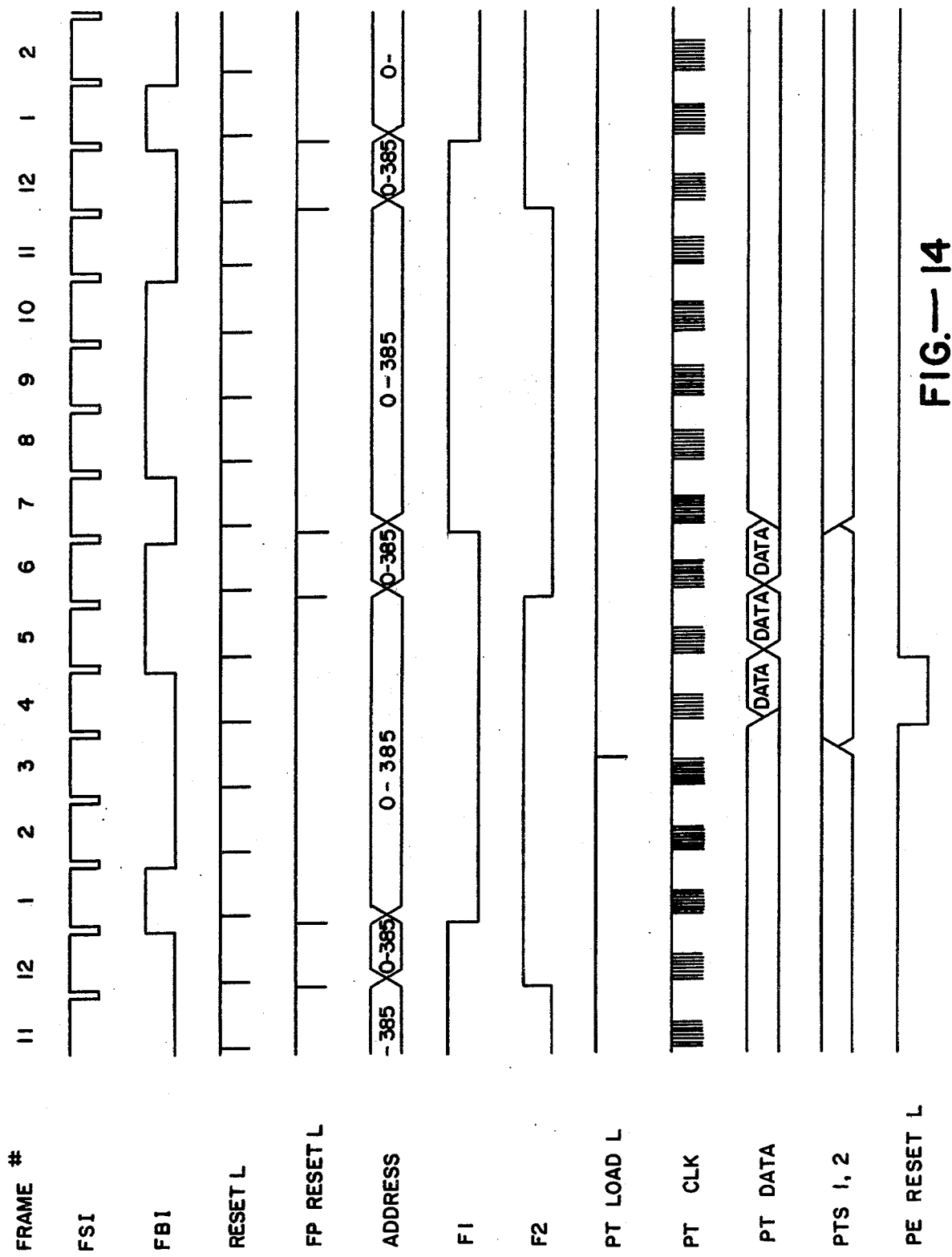
FIG.—14

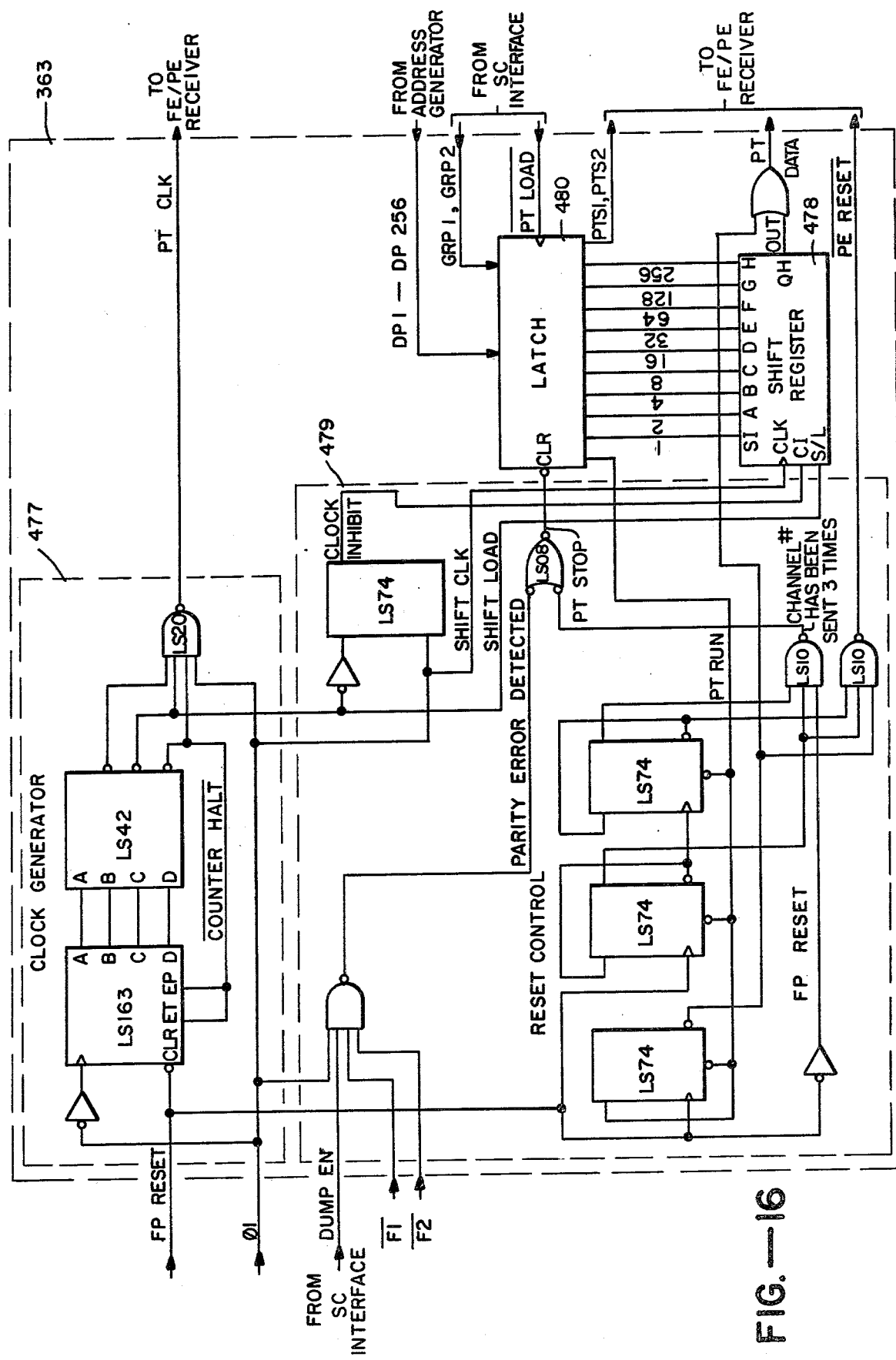
FIG.—16

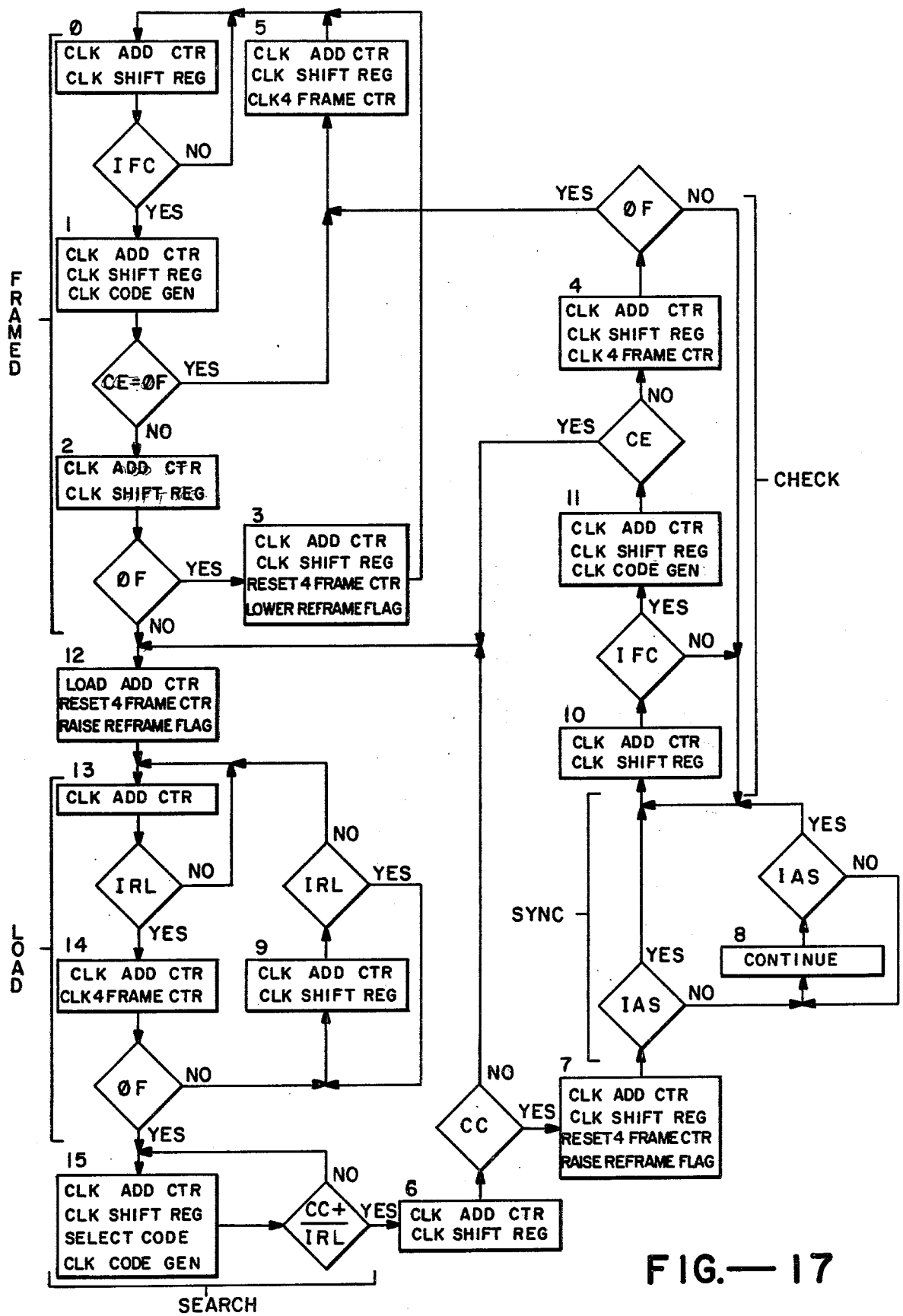
FIG.—17

PATH TEST APPARATUS AND METHOD

This is a continuation, of application Ser. No. 762,934 filed Jan. 26, 1977 now abandoned.

CROSS REFERENCE TO RELATED APPLICATIONS

1. INTEGRATED MESSAGE ACCOUNTING SYSTEM, Ser. No. 781,348, filed Mar. 25, 1977, invented by John C. McDonald and James R. Baichtal, and assigned to the same assignee as the present invention.
2. TIME SLOT INTERCHANGER, Ser. No. 762,811, filed Jan. 26, 1977, now U.S. Pat. No. 4,071,703, invented by Craig Schaffter, and assigned to the same assignee as the present invention.
3. DIAL PULSE REGISTER/SENDER FOR A TDM SWITCHING SYSTEM, Ser. No. 762,801, filed Jan. 26, 1977, now U.S. Pat. No. 4,133,980, issued Jan. 9, 1979 invented by Johannes R. Moed, and assigned to the same assignee as the present invention.
4. MULTIFREQUENCY SENDER/RECEIVER IN A MULTI-TIME SLOT DIGITAL DATA STREAM, Ser. No. 762,809, filed Jan. 26, 1977, and now U.S. Pat. No. 4,133,979, issued Jan. 9, 1979 invented by Bradley A. Helliwell and James R. Baichtal, and assigned to the same assignee as the present invention.
5. A DOUBLE REDUNDANT PROCESSOR SYSTEM, Ser. No. 781,437, filed Mar. 25, 1977, invented by John C. McConald and James R. Baichtal, and assigned to the same assignee as the present invention.
6. SERVICE GENERATOR CHECKING APPARATUS AND METHOD, Ser. No. 762,808, filed Jan. 26, 1977, now U.S. Pat. No. 4,071,704, invented by Johannes R. Moed, and assigned to the same assignee as the present invention.
7. SERVICE GENERATOR FOR GENERATING A PLURALITY OF TONES, Ser. No. 762,810, filed Jan. 26, 1977, now U.S. Pat. No. 4,110,562, invented by Johannes R. Moed, and assigned to the same assignee as the present invention.

BACKGROUND OF THE INVENTION

The present invention relates to path test apparatus and a method for use in a telephone system operating in time frames each consisting of a plurality of time slots.

Pulse code modulated (PCM) techniques used with telephone switching enables a multiplicity of conversations to be transmitted over a two wire digitally multiplexed line commonly known as a T1 trunk line. In a telephone system operating with a PCM format, PCM signals on T1 trunk lines are multiplexed together into what is known as a line group. A line group will connect serial PCM data to parallel format of 8 bits of data. Multiplexing up to 16 T1 lines each having 24 channels of PCM data thereon will provide 384 time slots per line group to be switched through the system. In the above identified application, entitled "Integrated Message Accounting System", up to 4 line groups may be accommodated, thereby providing 1536 time slots. The system is capable of switching PCM data from one time slot in one line group to any other time slot in any other line group.

There is a need for a path test scheme to insure that a particular path is in fact set up through the digital switch. Otherwise, a subscriber in a tributary office initiating a 1+ DDD call could be switched to an improper time slot in another line group thereby preventing proper completion of his call to the called party.

Because the electronic digital design of a PCM telephone system is capable of extremely high switching speeds, the path test scheme must be capable of being performed in an extremely short time period in order for the system to make proper connections from one channel time slot to another.

Prior art systems, in addition to the 8 bits of data, add a parity bit (9 bits total for each time slot), and another bit which is a test bit and is transmitted along with the PCM data bits. Prior art systems thus require a tenth bit in order to test the continuity of a particular path set up between locations in a telephone system.

In accordance with the above background, it is desirable to provide path test apparatus and a method that does not require the use of additional hardware, such as required for a tenth bit, to test the continuity of a data path in a telephone system.

SUMMARY OF THE INVENTION

The present invention relates to path test apparatus for use in a telphone system having an interface including an input portion connected to an input line for receiving input telephone signals and having an output portion connected to an output line for transmitting output telephone signals, the system operating with the telephone signals in time frames each consisting of a plurality of time slots.

The test apparatus includes test signal generator means, connected to the input portion, for connecting a test signal to a selected one of the time slots whereby the test signal occurs in the selected time slot in the input portion. Control means are provided, connected to the test signal generator means, for specifying the selected time slot.

The apparatus includes means for connecting a data path between the input portion and the output portion whereby the test signal occurs in a time slot in the output portion. The apparatus also includes means for detecting the test signal occurring in the time slot in the output portion, thereby verifying the continuity of the path between the input portion and the output portion.

In accordance with the above summary, the present invention achieves the objective of providing test apparatus and a method for verifying the continuity of a data path in a telephone system between an input portion connected to an input line for receiving input telephone signals and an output portion connected to an output line for transmitting output telephone signals where the system operates with telephone signals in time frames each consisting of a plurality of time slots.

Additional objects and features of the invention will appear from the description in which the preferred embodiments of the invention have been set forth in detail in conjunction with the drawings.

DESCRIPTION OF THE DRAWINGS

FIG. 1 is a block diagram of an integrated message accounting system in accordance with the present invention.

FIG. 2 is a representation of the time slot frame structure employed within a multiframe format.

FIG. 3 shows the frame bit code utilized by the integrated message accounting system of FIG. 1.

FIG. 4 shows the system time slot organization of the integrated message accounting system.

FIG. 5 shows a block diagram of a T1 input portion of the I/O interface of FIG. 1 which is a portion of the FIG. 1 system.

FIG. 6 shows a block diagram of a T1 output portion of the I/O interface of FIG. 1 which forms part of the FIG. 1 system.

FIG. 7 shows a block diagram of a digital switch which forms part of the FIG. 1 system.

FIG. 8 is a timing diagram for the system master clock of FIG. 1.

FIG. 9 shows a block diagram of the signal processor, which is a portion of the FIG. 1 system.

FIG. 10 shows a block diagram of the signal processor control, which forms a portion of FIG. 9.

FIG. 11 shows a block diagram of the system controller interface, which forms a portion of FIG. 9.

FIG. 12 shows a block diagram of the framing error/parity error receiver, which forms a part of FIG. 9.

FIG. 13 shows a schematic diagram of the parity error receiver, which is a part of FIG. 12.

FIGS. 14-15 are timing diagrams for describing the operation of the signal processor control of FIG. 10.

FIG. 16 shows a schematic diagram of the path test circuit, which forms a part of FIG. 9.

FIG. 17 shows an exemplary flow chart for describing the operation of the reframe control circuit, which forms a portion of FIG. 5.

DETAILED DESCRIPTION OF THE INVENTION

Referring to FIG. 1, the integrated message accounting system (IMAS) is seen in block diagram form. The IMAS can be used at class 4P toll points to process 1+ toll calls originating in class 5 offices, local calls, and other similar uses. It may be used as a LAMA (Local Automatic Message Accounting) system or as a CAMA (Centralized Automatic Message Accounting) system.

The basic functions of the IMAS are to provide recording of calls on magnetic tape, alternate routing for originating traffic, ONI operation, traffic monitoring reports, tandem routing for completing traffic, and WATS service (wide area telephone service). Further details of the IMAS are described in the above-referenced application entitled "Integrated Message Accounting System".

In FIG. 1, the span terminating equipment (STE) 86 is well-known equipment which functions to transmit, receive, terminate, monitor status of, or loop back the PCM bit streams of T1 lines used as digital trunks in connection with the IMAS.

The VB3 voice bank 87 is well-known equipment which provides time division multiplexing-demultiplexing, PCM encoding-decoding and terminal failure group alarm functions between 24 telephone circuits (VF and signaling) and a 1.544 MB/S bipolar pulse stream in D3 format. As seen in FIG. 1, VB3 87 provides appropriate interfacing with tributary offices, toll network, WATS service, recorded announcements, local first selectors, and Operator Number Identification (ONI) positions. The pulse stream is applied to a T1 input/output interface in the IMAS digital switch. Individual trunks (channel units) are chosen and configured appropriately for each application.

In FIG. 2, the PCM data format in the STE and VB3 equipment is compatible with the American Telephone and Telegraph Company's D3 channel bank, the operation of which is well known. With a sampling frequency of 8,000 Hz for encoding PCM data, one timing frame equals 125 microseconds with 24 time slots per frame per T1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame for a D3 channel bank.

In FIG. 3, the frame bit occurs once at the start of each frame. It contains a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 1, quantizing a message signal by certain discrete levels or steps inherently introduces an initial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 1, the unit 20 is either a STE 86 or a VB3 87 unit as previously described. Data from STE/VB3 unit 20 is applied to both the primary and secondary interfaces of a line group 10. For example, data is input to T1 I/O primary interface 11 and the secondary I/O interface 15 via buses 34, 35, and 34, 36, respectively. Data is output from T1 I/O interfaces 11, 15 to STE/VB3 unit 20 via buses 41, 40 and 42, 40, respectively.

As seen in FIG. 1, primary and secondary interface redundancy is employed in all major subsystems in the IMAS to prevent a single point failure which could cause the system to go down. Faulty subsystems are automatically switched off line to provide minimum interruption to service. Further details of the subsystem redundancy are described in the above-referenced application entitled "Integrated Message Accounting System".

A line group 10 interfaces any T1 line pair such as lines 34 and 40 with four Time slot Interchangers (TSI) 21 designated TSI $\phi$-3. A primary T1 I/O Interface also interfaces the optional primary multifrequency sender (MFS) 13 and receiver (MFR) 14 with the TSI 21. A primary T1 I/O interface such as interface 11 accepts bipolar PCM data from a T1 line (34, 40) carrying information in D3 format (standard D3 decode transfer characteristic). A secondary (redundant) T1 I/O Interface such as Interface 15 alos interfaces any T1 line pair such as lines 34, 40 with the TSI 21. Interface 15 also interfaces the secondary MFS 17 and MFR 14 with TSI 21.

Incoming data from a unit 20 is stored and synchronized by the I/O Interface such as interface 11 to the IMAS system frame. Data is converted by each I/O interface to 9 bit parallel (includes parity bit) and sent to the time slot interchanger (TSI) 21. Carrier group alarm (CGA) detection (B2=0) and signal bit recovery (Bit 8 of 6th and 12th frames) is also accomplished. Error signals and signal bits are sent to the primary signal processor (SP) 72 or secondary SP 75 for further analysis.

It is possible to operate 16 of these T1 I/O interfaces for each primary and secondary subsystem per line group. Each I/O interface accommodates one T1 line or one VB3 voice bank. Up to four line groups per system may be used. Further discussions of the various primary and secondary subsystems will be limited to the primary subsystem, although it will be understood that the discussion would apply with equal effect to the secondary subsystem.

A line group organizes the voice frequency data from 16 T1 lines or 15 T1 lines and the MFS onto a 384 time slot data bus to the TSI's (TSI$\phi$-TSI3).

Referring to FIG. 4, one frame is equivalent to 125 microseconds or 193 bits. The frames recur at the 8KHz sampling frequency. There are 24 D3 channel numbers as indicated by N, and there are a total of 384 time slots of 324 nanoseconds each, with an additional two time slots for the frame bit. FIG. 4 shows how time slots are organized with respect to the incoming frame. The first 6 time slots are constructed of data from channel one of the 16 incoming frames. The next 16 times are from channel 2 and so on. Each T1 I/O interface is allocated to one of 16 time slots for each D3 channel. 16 T1 lines are each input to the respective T1 line I/O interface and multiplexed to time slots 0-15. P indicates the particular line group interface accessed during a channel number. For example, during channel number one, P1 would indicate primary I/O interface 11 and secondary I/O interface 15 of FIG. 1 is accessed. P15 would indicate primary I/O interface 12 and secondary I/O interface 16 are accessed. P16 would indicate primary multifrequency sender 13 and secondary sender 17 of FIG. 1 are accessed. If the line group did not employ a multifrequency sender and receiver, P16 would indicate accessing another I/O interface. During channel 24, P16 would indicate the primary MF receiver 14 and secondary MF receiver 18 are accessed. The D of FIG. 4 indicates the decimal time slot for the line group from 0-385. D3 channels 1-8 are assigned to the MF sender. D3 channels 17-24 are assigned to the MF receiver and D3 channels 9-16 are assigned to either MFS or MFR, dependent upon traffic conditions.

In FIG. 1, the IMAS digital switch comprises line groups 0-3 and TSI 0-3.

Referring to FIG. 1, the TSI 0-3 switch channel time slot data from any of the four line groups to any other channel time slot of any other of the four line groups. For example, data from line group 0 could be sent via bus 26-1 to TSI 0 and switched out bus 28-4 to line group 3. The TSI's receive channel time slot data (8 bits plus parity). When it is available from the line group data bus, the TSI's hold it until the proper time for output in the next frame and transmit the data to the line group data for output. The TSI contains control and data memory for all time slots. The TSI's communicate with both the primary and secondary system controllers (SC) 50, 64 via bus 57, 63. Further details of the digital switch are described in the above-referenced application entitled "Time Slot Interchanger".

In FIG. 1, the primary and secondary service generators (SG) 22, 23 provide capability to connect one of several standard tones in PCM format to any of the channel time slots. These tones include 1,000 Hz, 120 IPM busy, 60 IPM busy, dial tone, ring back tone and internal tones for the IMAS. The primary and secondary SC 22, 23 receive control signals from the respective system controller (SC) 50, 64. Further details of the service generator are described in the above referenced application entitled "Service Generator For Generating A Plurality Of Tones".

The primary and secondary signal processors (SP) 72, 75 monitor all the input channels of the IMAS for changes of state and dial digits. Each time a channel is seized or released, or a digit is dialed, a message is sent to the respective SC 50, 64 via buses 74, 77, containing the channel number and the event. All the information needed to determine the changes of state or dial digits is time division multiplexed over several leads originating from the line group.

The SP 72, 75 also have the capability to seize or release channels or dial digits on these channels. Frames 6 and 12 are signaling frames. During these frames, the least significant bit of the 8 bit PCM byte is replaced with a signaling bit. Frame 6 is used for an A signaling bit and frame 12 is used for a B signaling bit. The signal processor uses the A signaling bit for seizure, release and dial digit detection. The B signaling bit is used for state change detection only. Further details of the signal processor are described in the above-referenced application entitled "Register/Sender".

In FIG. 1, the primary and secondary system Master Clock 79, 78 is a conventional device for generating all basic clock signals used by the IMAS. The clock generates 4 clock signals MCLK0$\phi$-MCLK3 all of which are 3.088 MHz square waves, but each one is phase shifted by 270 ns nominal. The purpose of this phase shifting is to allow for propagation delay of data as it is routed through the different subsystems contained in the IMAS.

Referring to FIG. 8, the basic frequency of the system master clock is a crystal generated 18.528 MHz. The basic frequency of the system master clock is divided down to the 3.088 MHz square wave.

Master frame pulses FS$\phi$-FS3 generate a 648 ns pulse every 125 us and are used to mark the start of a new frame. FS$\phi$-FS3 are primarily used by subsystems to synchronize their address generators.

The master frame bit signal FB$\phi$-FB3 generate a repeating pattern of serial bits. The pattern repeats every 12 frames and the bits can be decoded to identify each of the 12 frames as seen in FIG. 3.

Again referring to FIG. 1, in addition to the clock signals of FIG. 8 originating from the master clock, an "Active" signal originates from the system controller 50, 64 of FIG. 1 to inform some of the IMAS subsystems that they are on line.

In FIG. 1 the operator number identification subsystem (ONI) 80 provides a control interface between the IMAS and ONI operator positions for serving lines not equipped with automatic number identification (ANI) or for calls experiencing ANI failure.

The MF senders (MFS) 13, 17 generate and output MF tone pairs onto the line group data bus 26-1, 44-1 for switching through the time slot interchangers 21 to an outgoing path such as 28-4, 46-4. The MFS 13, 17 communicate directly with system controllers 50, 64 via buses 37, 47, respectively. The MF receivers (MFR) 14, 18 detect MF tones in PCM digital input form and send them to the SC 50, 64 via buses 38, 48, respectively.

The MFS and MFR jointly share one group of 24 D3 time slots and associated control facilities. A minimum of 8 time slots and a maximum of 16 time slots for each sender such as MFS 13 and each receiver such as MFR 14 are available to traffic at any time subject to a total maximum of 24 time slots. Systems with more than one line group may be equipped with the above capacity per line group as required by traffic. Further details of the MF sender and receiver are described in the above-identified application entitled "Multifrequency Sender/Receiver in a Multitime Slot Digital Data Stream".

The primary and secondary system controllers (SC) 50, 64 are Intel 8080A stored program controllers surrounded by a number of peripheral devices and interfaced to each subsystem. The System Controllers provide the following functions:

(1) call processing including routing, ANI (Automatic Number Identification), ONI, recorded announcement control and creation of billing records.

(2) SC self test (3) system test and maintenance data outputs for accumulation of traffic monitoring data and generation of traffic monitoring reports. The secondary (redundant) SC 64 is updated continuously so that it can assume control of the system with a minimum disruption to service should primary SC 50 experience a failure. Further details of the system controller are described in the above-referenced application entitled "A Double Redundant Processor System".

The peripheral devices connected to the System Controllers 50, 64 are as follows:

The CRT 51 which is used for:
a. Primary system information display (e.g., traffic, alarms, maintenance program results)
b. Keyboard entry of system control commands and data (e.g., translation table data, trunk-type assignments, test trunk control, and system diagnostic control)

The CRT 51 is the primary system interface to office personnel. Printer 67: provides printed output records of traffic, alarms, maintenance diagnostics and other system data. In the event of CRT 51 maintenance of failure, the printer may be used as a substitute input-output device. MTR 52 - The magnetic tape recorder is the primary system billing recording device. The MTR 52 records can be read by a similar industry standard MTR in an EDP data center. MTC 53 - A magnetic tape cartridge recorder is associated with each SC, primary and secondary. The MTCs are used to load standard programs and office data from tape cartridges. Additionally, the secondary MTC is used as a backup recording device when the MTR is not in service. RTC 54, 65 - The Real-Time Clock generates the stable time bases for timing all programs in each SC 50, 64. COI 55, 56, 68, 69 - Control Office Interfaces are used to interface signals in and out of the CO (e.g., Dynamic Overload Control Signals - DOC). Office Connection Panel 71 - the OCP contains terminal blocks for connection of the system to office alarms, DOC and other office signals as required. Status and Alarm Panel 70 - the SAP provides basic system status and alarm display and allows limited, direct control of essential functions. It communicates with the SC via COIs. Test Trunk Panel 88 - the TTP provides jackfields and access to voice and signaling of two 4-wire trunks assigned as system test trunks. Pushbutton switches on the panel allow for talking, dialing and testing on each trunk, for patching together the two test trunks and for momentary monitoring of a call in progress. ANI Adapter 83 (optional) - provides interface facilities between standard local identifiers and the IMAS SC and VB3 trunks. An example of a call processing overview of the IMAS will be given to provide a better understanding of the operation of the present invention. The overview will be given in conjunction with FIG. 1 and assumes that the primary portion of the IMAS is on-line. The secondary portion of the IMAS is off-line but would automatically be switched on-line should the primary portion experience a failure. Therefore, the description of the call processing overview as it applies to the primary portion of the IMAS will apply with equal effect to the secondary portion.

CALL OVERVIEW

Referring to FIG. 1, a subscriber in a tributary office 90 goes off hook, receives a dial tone from the local office and dials "1" to initiate a 1+ direct distance dialing (DDD) call. This causes a 1+ toll connecting trunk 92 to the IMAS to be seized (go off hook) at the tributary office 90. The seizure is passed into the IMAS through STE/VB3 unit 20 as a change of state of a signaling bit on a T1 line such as 34, 40 entering a T1 I/O interface such as interface 11. The seizure is recognized by the signal processor 72 which passes the change in trunk state to the system controller (SC) 50. The Controller 50 begins a process of building up a Call Processing Record. As the subscriber dials a called number, the signal processor (SP) 72 detects each dialed digit and forwards it to the SC 50 for storage in memory.

At the appropriate time, the Controller 50 signals the tributary office 90 via the SP 72 to initiate calling number identification. The tributary identifier in the tributary office 90 is activated, the SC 50 connects an MF receiver (by assigning the MFR 14 to a time slot corresponding to the time slot occupied by the 1+ originating trunk 92) and the Calling number information is passed to the MFR 14. The MFR 14 forwards each digit received to the SC 50 where this information is assembled in memory with called number and other information necessary to form a complete record for eventual use as a billing record.

With called number information in the memory of the SC 50, the controller 50 proceeds to perform a translation (3 digits or 6 digits as required). An outgoing trunk group connected to Toll Network 91 is chosen and an idle outgoing trunk such as trunk 93 is selected. The digital switch (consisting of line group 10 and time slot interchanger 21 paths) is set up and path tested for path continuity. The MF sender 13 is commanded by the SC 50 to out pulse an MF tone. Alternatively, dial pulse sending (DP) is also possible using the SP 72.

The SP 72 monitors the state of the outgoing trunk 93 after outpulsing and initiates call timing in the SC 50 at answer supervision by using the real time clock 54 associated with the SC 50. The SP 72 continues to monitor the state of the outgoing trunk signaling until the call is terminated. At this point, the SP 72 informs the SC 50 that the subscriber associated with the tributary office 90 went back on hook. The SC 50 then assembles a billing record in its output memory buffer area. When a block of 16 billing records is present in the buffer area, it is written on the output magnetic tape recorder (MTR) 52.

The information contained in a call record is: the date; connecting time; elapsed time in minutes and seconds; originating number; terminating number; type code; class code; information code; time and charge code; trouble code; CPFR code; incoming trunk ID; outgoing trunk ID; and toll center number.

Referring to FIG. 5, the input portion of the T1 I/O interface 11 of FIG. 1 accepts serial bipolar PCM data from a T1 line 35 carrying information in D3 format. Each time slot of incoming data comprises 8 bits of PCM sampled data so that there are 192 bits for 24 channels per T1 line plus one framing bit. Incoming data is stored and synchronized to the IMAS system frame. Serial data is converted to 9 bit parallel (8 bits data plus parity bit) and sent to the time slot interchanger (TSI). Carrier group alarm (CGA) detection (Bit 2=0) and signal bit recovery (Bit 8 of 6th and 12th frames) is also accomplished. Error signals and signal bits are sent to the signal processor for further analysis.

It is possible to operate 16 of these interfaces per line group. Each interface accommodates one T1 line or VB3 voice bank. Up to 4 line groups per system may be used.

Incoming PCM data on Bus 35 from the unit 20 is converted to normal TTL levels by a conventional Unipolar Converter 102 and gated through the conventional Data Select 131 on Bus 103 by an Active signal applied to the line group in response to the Master Clock 78 under control of the system controller 50 of FIG. 1.

The Master Clock 78 provides the necessary timing signals to the Input Timing Generator (ITG) 129 via bus 60. The ITG 129 includes conventional counters and logic to distribute common miscellaneous timing functions to the various subsystems of the I/O Input Interface of FIG. 5. The conventional Clock Recovery circuit 110 receives the PCM data and reconstitutes a clock signal to provide a clocking edge that lags the data bit by one quarter period of the square wave period. Data is loaded from Data Select 104 into a holding buffer in the Elastic Store 106, a 256 bit store, via bus 105 until the next available write window from the Read/Write Control (RCW) 120. The Read/Write Control 120, a typical selector circuit to insure there is no interference between read and write times, then gates the Write Address Counter 118 through a conventional Address Select Circuit 129 to the Elastic Store 106 and writes the data bit at this address location on a 256×1 bit RAM. The Write Address Counter 118 is 8 bits wide (to address 192 bits of data per T1 line) and free running at 1.544 MHz. Since the system clock has a basic frequency of 3.088 MHz, it will have 2 rising edges per incoming data bit; thus there are two available write windows per incoming bit to assure that each bit will be written in the Elastic Store 106 regardless of the phase or jitter of the recovered incoming clock with respect to the master clock timing of the ITG 129.

When the line group is not active, data from the output interface of FIG. 6 is looped around through Data Select 104 of FIG. 5 via Bus 199. This allows off line checking of a line group to be sure that it is ready for service, the details of which are more fully described in the above-identified application entitled "Service Generator Checking Apparatus And Method".

The Reframe Control Circuit 144 controls the state of the Read Address Counter 154, and clocks the appropriate data bit from the Elastic Store 106 into the Serial To Parallel Converter 136 via Bus 132. Converter 136 is a conventional shift register. When the 8 bit word (D3 format) of a T1 channel is present in the Serial To Parallel Converter 136, it is clocked into the Output Buffer 140 via 8-Bit Bus 138 by the ITG 129 along with a parity bit from Parity Generator 134 computed at the input to the Serial To Parallel Converter 136. ITG 129 then sequentially connects this output buffer 140 in its turn with 15 other input interface circuits of the FIG. 5 type to the TSI bus 26-1 through Line Driver 143 and bus 24-1 to the TSI of FIG. 7. TSI bus 26-1 is a conventional three-state bus that is accessed by the other fifteen T1 input interfaces in their turn to form 384 (16×24 D3 channels) time slots. The 16 input interface circuits each with their 24 T1 channels (D3 format) form the 384 (16×24) channels per line group.

Once per frame, the Reframe Control 144 compares the frame bit at the appropriate position in the Serial To Parallel Converter 136 with its own frame code generator. If two or more errors in four frames occur, a reframe mode is initiated. Reframing is accomplished by adjusting the delay through the Elastic Store 106. A frame error signal appears on bus 147 for transmission to SP 72 of FIG. 1 via bus 73-1.

The Reframe Control 144 includes a comparator, four frame counter and processor, which includes a PROM and data selector. A group of data bits in the vicinity of the system frame bit time is inspected for potential frame bits. Each bit position is checked until it either produces the correct framing sequence for ten frames or one error in a potential sequence is detected. When the entire group has been checked and no frame code sequence has been found, the Read Address Counter 154 is advanced to select the next group of bits. This process continues until the above mentioned framing sequence is found. The "found" bit position is synchronized with the system frame bit position by delaying the Read Address Counter 154 and a framed condition is reestablished.

An exemplary flow chart for describing the operation of the processor contained within the reframe control is shown in FIG. 17. The processor of reframe control 144 will execute the following steps for finding the framing bit for the line group.

In FIGS. 3 and 4, the frame bit position shown occurs once at the start of each frame. It contains a framing code that takes 12 frames to repeat.

Referring to FIG. 17, steps 0, 1, 2, 3, and 5 are executed in a sequence when the reframe control 144 is in a framed condition. The read address counter 154 and converter 136 of FIG. 5 are continuously being clocked once per incoming bit. Thus the read address counter 154 keeps pace with the write address counter 118.

The processor will wait at step 0 until IFC (input frame control) decision sends it to step 1. IFC is a typical signal from the ITG 129 of FIG. 5, which occurs one D3 time slot after the frame bit. If IFC is no, the processor returns to step 0. If IFC is yes, the processor proceeds to step 1.

At step 1, the frame code generator/comparator (internal to the reframe control 144) is clocked to keep its internal frame bit up to date. In addition, the Address Counter 154 and Converter 136 of FIG. 5 are incremented as in step 0.

At this point the incoming frame bit FB is compared with the internal frame bit. Assuming the four frame counter is at frame 0, if no code error is detected (CE=OF) the processor will continue to step 2 and clock the address counter 154 and converter 136 of FIG. 5.

From step 2, the processor goes to step 3 if the four frame counter is at frame zero in its count where the four frame counter is kept reset and a reframe flag is lowered. Lowering the reframe flag will apply the appropriate flag state to the most significant bit of the four frame counter when being loaded.

The processor returns then to step 0 and repeats the cycle.

In step 1, if the frame code generator does detect a code error, at frame zero or no code error at frames 1, 2, or 3 (CE=OF is a yes condition), the processor branches to step 5 where the four frame counter is incremented to the next state. The cycle repeats until the four frame counter returns to 0 or another code error occurs. A second error in four frames causes the reframe mode to be entered at step 12 via step 2.

At step 12, the reframe flag is raised when the four frame counter is reset. Raising the reframe flag applies the appropriate reframe flag stage to the most significant bit (MSB) of the four frame counter when being loaded. Also, the read address counter 154 of FIG. 5 is advanced 8 counts with respect to the write address. For 3 consecutive frames, the 8 bits in this frame position are loaded into converter 136. This is accomplished in steps 13, 14 and 9 and is controlled by decision IRL (input reframe load) and the four frame counter of reframe control 144. IRL is another timing signal from ITG 129 of FIG. 5.

When the four frame counter returns to frame 0, the processor branches from the load loop to state 15. At this point the 4th set of 8 bits together with the three previous sets of 8 bits form 8 4-bit words that are clocked into the frame code generator and inspected one at a time for any of the twelve codes shown in FIG. 3. If one is found, the code compare (CC) indicates that a potential frame code sequence has been found and the processor goes to step 6. If no valid code is found the processor branches to step 6 after the 8th word has been inspected.

Referring to FIG. 17, at step 6, the processor checks CC to see if it has terminated the search mode. If not the processor jumps back to step 12 to repeat the process for the next 8 bits in the frame. If CC is a yes, then the sync mode is entered at step 7.

In steps 7 and 8, the four frame counter is set to zero to prepare for the check mode, and the position of the found code is synchronized to the system frame bit position by decision IAS (input address sync), a timing signal from ITG 129 of FIG. 5.

Steps 10, 11 and 4 are the check mode in which the processor inspects the FB position in the normal manner for 3 more frames, after rechecking the found bit. Decision CE (code error) indicates that the incoming frame bit is not equal to the frame code generator bit. If CE is yes, it will cause the processor to jump back to step 12 to repeat the process. Otherwise the four frame counter returns to 0 and the processor branches to step 5. Three more FB positions are checked for errors with a single error causing a return to step 12 via step 2.

After 10 consecutive FB positions containing no errors have occurred, the processor restores a framed condition at step 3.

In FIG. 5, signal bits are written into the Signal Bit Store 150, a 32×4 bit RAM, during frames 6 and 12, as determined by the internal frame code generator of the Reframe Control 144 from the appropriate output of the Serial To Parallel Converter 136. Since the Reframe Control 144 synchronizes the incoming frame bit to the nearest system frame bit position, the incoming frame number bears no relation to the current system frame number. Therefore, signal bits from the Signal Bit Store 150 are allowed to stay on line for 12 consecutive frames to be sure they are valid during the system signaling frames.

During normal operation, the second bit position (next to the most significant bit) in all 24 words is inspected by conventional Detector 148. If all 24 bits are zero, then a B2=0 signal appears on bus 149 which is set to SP 72 of FIG. 1 via Bus 73-1.

The B2=0 means that all 24 bit 2 positions in one frame (D3 format) are 0. This is a carrier group alarm (CGA) sent by the associated D3 equipment. The framing error has priority over the B2=0 error.

Signal bits, B2=0 error signals, and framing errors are applied to the SP bus 73-1 and sent to the SP in the same manner as data sent to the TSI. These signals are processed and relayed to the System Controller to give trunk status information.

Path tests are performed to insure that the particular path is or is not set up through the TSI. The Path Test Generator (PTG 156) receives a command from the SP via bus 73-2 to invert the parity bit of the channel under test. The parity is inverted at line driver 143. Parity checking of all output interfaces discloses the results of the path test. Further details of the path test are described subsequently.

Referring to FIG. 6, the output interface accepts data from the TSI and Signal Processor (SP) in parallel form. It is converted to a serial format and then to bipolar PCM to be applied to the T1 line. During signaling frames, signal bits from SP are inserted at the appropriate place in the parallel word. The signaling frames in the IMAS are frames 6 and 12 with the 8th bit of each channel time slot allocated for a signal bit to indicate on-hook or off-hook status. Also, a zero suppression circuit maintains at least a 1 out of 16 pulse density on the T1 line. The zero suppress circuit monitors all 8 bits being applied to the parallel to serial converter. If all 8 bits are 0, Bit 7 is forced to a one. This insures that no more than 15 consecutive zeros will appear in a T1 stream, a condition necessary to keep clock recovery circuits alive. A parity check is made of all data. Parity errors are sent to the signal processor for analysis.

It is possible to operate 16 of these interfaces per line group. Each interface accommodates 1 T1 line or VB3 voice bank. Up to four line groups per system may be used.

Referring to FIG. 6, the output portion of the I/O Interface 11 of FIG. 1 is shown in more detail. Data from the TSI is applied to the conventional Input Buffer 167 via Line Receiver 165 and buses 28-1, 30-1.

The Output Timing Generator (OTG) 196 loads Input Buffer 167 whenever an outgoing PCM word appears on the bus 30-1. The OTG 196 is similar to the ITG 129 of FIG. 5. When 16 words have been loaded (1 word in each buffer for up to 16 interfaces), the conventional Parallel To Serial Converter 171 in all of the interfaces is loaded with this data. The serial data immediately starts shifting out on the T1 line 41 via the Bipolar Converter 179 and the T1 Line Driver 181. The Active signal from Master Clock 78 of FIG. 1 controls a pair of relays that connect the T1 Line Driver to the T1 line. The primary and secondary interfaces are connected in parallel at the T1 line. Therefore the off-line driver is disconnected by the relays.

During system frames 6 and 12, signal bits are inserted at Bit 8 via the Signal Select 175, which is similar to data select 104 of FIG. 5. In FIG. 6, signal bits are received from the signal processor via bus 73-3, 192 and line Receiver 191, and are loaded with parity in the same manner as data from the TSI. Bus 73-3 corresponds to Bus 73 of FIG. 1.

In FIG. 6, the Zero Suppress circuit 174 is a comparator circuit that monitors all 8 bits being applied to the Parallel To Serial converter 171. If bits 1-6 and 8 are 0, Bit 7 is forced to a 1. This insures that no more than 15 consecutive zeros will appear in a T1 stream, a condition necessary to keep clock recovery circuits alive.

The conventional Parity Checker 184 is preset to its start state at the beginning of each serial word. The preset state is determined by monitoring data parity, signal parity if frames 6 or 12, and the Zero Suppress circuit 174. The Parity Checker 184 computes parity on the serial word as it is applied to the input of the T1 Line Driver 181. The proper parity error condition exists at the end of the serial word and is loaded into the Parity Muxer 186 along with the 15 other parity error conditions. The Parity Muxer 186 sends the 384 channels of parity error data per frame to the Signal Processor 72 of FIG. 1 via Line Driver 188 and buses 187, 73-2. Bus 73-2 corresponds to Bus 73 of FIG. 1.

In FIG. 6, the frame bit is always applied to the serial input of the Converter 171. The OTG 196 only allows the frame bit to shift through to the output at the appropriate frame bit time.

When a line group is off line, the Active signal will select data from the Bipolar Converter 179 instead of data from the Unipolar Converter of the T1 input interface of FIG. 5. This allows a loop around test to be performed by the Service Generator (SG) 22 of FIG. 1. The T1 input interface frames up on the serial T1 stream from the output section allowing TSI output bus data to be looped around to the TSI input bus. Further details of the loop around test are described in the above-identified application entitled "Service Generator Checking Apparatus and Method".

Referring to FIG. 7, the timed division multiplexed PCM digital switch network configuration used in the IMAS is shown. The digital switch comprises line groups 0-3 and TSI 0-3 of FIG. 1. Network paths have been derived by multiplexing together sixteen 24-channel T1 lines in a line group to form 16×24 or 384 time division channels or time slots. In a full size IMAS there are 4 line groups 10 for a total of 1536 terminations or channels. Each line group has primary and secondary redundancy as previously described, but not shown here. The channels appear sequentially on the horizontal input paths 26-1 to 26-4 of the network and are switched to the desired outgoing paths 28-1 to 28-4 by the time slot interchanger TSI φ-3, associated with the vertical paths 208-1 to 214-4 of the network.

As an example, assume a call is in progress from LG0 to LG1 through TSI 0. In operation, under control of the System Controller 50, an originating channel sample from one of the T1 lines is multiplexed out on a horizontal path such as path 26-1 as one of 384 time slots for the group. The data is switched to a vertical path such as 210-1 to TSI 0. The TSI 0 transfers the sample to its memory, where it is held until the terminating channel time slot in the next frame appears, whereupon the sample is transferred back on path 208-1 and switched to a path such as 28-2 to the line group LG1 and the T1 line on the terminating channel. Further details of the TSI are described in the above-identified application entitled "Time Slot Interchanger".

Referring to FIG. 9, the primary signal processor (SP) 72 of FIG. 1 is shown in more detail. The signal processor includes SP control 301, system controller (SC) interface 302, dial pulse register/sender 303, and framing error/parity error receiver 304.

The dial pulse register/sender 303 includes dial pulse register 305 and dial pulse sender 306.

Receiver 304 includes parity error receiver 371, framing error receiver 378, and signaling bit buffer 383. There is one dial pulse register/sender 303 and one receiver 304 per line group.

The interconnections of the various components of FIG. 9 will be described in more detail in conjunction with the description of FIGS. 10–15.

The System Controller Interface 302 of FIG. 9 handles all communications between the System Controller 50 of FIG. 1 and the Signal Processor 72. This is accomplished with two Universal Asynchronous Receiver Transmitters (UART). Each time the System Controller 50 communicates with the Signal Processor 72, it sends a three byte message containing the channel and line group number, and a 5 bit coded command. The Signal Processor 72 then sends a 1 byte response.

Each time the Signal Processor 72 communicates with the System Controller 50, a three byte message is sent, and the System Controller sends a 1 byte response.

The signal processor (SP) monitors all the input channels of the IMAS for changes of state and dialed digits. Each time a channel is seized or released, or a digit is dialed, a message is sent to the system controller containing the channel number and event.

All the information needed to determine the changes of state or dialed digits is time division multiplexed over several leads originating from the line group. The SP also has the capability to seize or release channels, or dial digits on these channels.

Messages sent in the code by the SC are state changes, digits to be dialed, status requests, and path tests. Messages sent by the SP are change of trunk status, dialed digits, parity errors, framing and B2=0 errors.

Upon receipt of a status request, the SP sends the status of the trunk in question back to the SC in the form of a change of trunk status message.

The messages are organized as follows in the following Chart I.

Chart I

| Bit | 7 | 6 | 5 | 4 | 3 | 2 | 1 | φ | |
|---|---|---|---|---|---|---|---|---|---|
| Byte 1 | X | X | X | X | X | X | X | X | low order channel number |
| Byte 2 | | | | | | | | X | high order channel number |
| | | | | | | X | X | | line group number |
| | X | X | X | X | X | | | | command |
| Byte 3 | X | X | X | X | X | X | X | X | complement of byte 2 |

The commands are as follows:
(1) From System Controller to Signal Processor

| Bit | 7 | 6 | 5 | 4 | 3 | |
|---|---|---|---|---|---|---|
| | φ | φ | φ | φ | φ | status request |
| | φ | φ | φ | φ | 1 | path test |
| | 1 | 1 | 1 | B | A | status of A and B signaling bits to be output |
| | | | 1 (1–10) | | | dial pulse digit to be output |

The Signal Processor response for these commands is:

| Bit | 7 | 6 | 5 | 4 | 3 | 2 | 1 | φ | |
|---|---|---|---|---|---|---|---|---|---|
| | | | | | | | | X | memory parity error LG #φ |
| | | | | | | | X | | memory parity error LG #1 |
| | | | | | | X | | | memory parity error LG #2 |
| | | | | | X | | | | memory parity error LG #3 |
| | | X | | | | | | | did not receive 3 bytes in time |
| | X | | | | | | | | retransmit this message. |

(2) From Signal Processor to System Controller

| Bit | 7 | 6 | 5 | 4 | 3 | | |
|---|---|---|---|---|---|---|---|
| | φ | 1 | 1 | B | A | status change on A & B signaling bits or reply to status request. |
| | 1 | | (1–10) | | | dial pulse digit received |
| | 1 | φ | φ | φ | φ | parity error detected |
| | φ | φ | φ | Y | Z | Y = B2 = φ error, Z = framing error |

The System Controller response for these commands is:

| Bit | 7 | 6 | 5 | 4 | 3 | 2 | 1 | φ | |
|---|---|---|---|---|---|---|---|---|---|
| | | | | | | | | X | disable parity errors for LG #φ |
| | | | | | | | X | | disable parity errors for LG #1 |
| | | | | | | X | | | disable parity errors for LG #2 |
| | | | | | X | | | | disable parity errors for LG #3 |
| | | | | X | | | | | reset parity error receivers |
| | | | X | | | | | | reset framing error receivers |
| | | X | | | | | | | reset signal processor |
| | X | | | | | | | | retransmit this message. |

The SC Interface 302 will provide appropriate signals to the other subsystems of the Signal Processor as will be described subsequently.

The SP control 301 of FIG. 9 is shown in more detail in FIG. 10. Control 301 generates all clock signals and addresses used in the signal processor with MCLK1, FS 1, FB 1, and MCLK 3 signals originating from the system Master Clock 78 of FIG. 1. MCLK 1 and MCLK 3 are both 3.088 MHz square wave slightly phase shifted to allow for propagation of data as it is routed through different subsystems. FS 1 is a 648 ns pulse that occurs every 125 us. The FS signal marks the beginning of each frame. The IMAS uses a twelve frame pattern where each frame is identified by a repeating sequence of signals over the FB 1 lead.

Frames 6 and 12 are signaling frames. During these frames, the least significant bit of the 8 bit PCM byte is replaced by a signaling bit. Frame 6 is used for the A signaling bit and frame 12 is used for the B signaling bit. The SP 72 uses the A signaling bit for seizure, release and dialed digit detection. The B signaling bit is used for state change detection only.

Referring to FIG. 10, the Signal Processor Control 301 is shown in more detail and includes a Frame Detector 360, a pulse generator which used Master Clock signals MCLK1 (φ1), FS1, FB1 and MCLK3 (φ3) for generating the signals FP Reset, Reset, F1, F2, and Reset signal for the Clock Generator 361. The FP RESET signal marks the beginning and ending of the signaling frames 6 and 12. Signals F1 and F2 form a 2-bit code that divides the 12 frame format into 4 segments, frames 1–5, frame 6, frames 7–11, and frame 12. Conventional selector gates will utilize the F1 and F2 signals to enable, at the proper time, control signals from the Control 301 and Interface 302.

One of the purposes of the Signal Processor is to outpulse digits on the outgoing trunks. This is done by manipulating the A and B signaling bits for the trunk. The Dial Pulse Generator 364 is a conventional pulse generator for generating a pulse speed of 9.95 pulses per second which the percentage break adjustable from 55% to 65.5% in 1.5% increments. The dial pulse Generator 364 generates the signals SP and EP which are sent to the dial pulse register/sender. The SP pulse marks the beginning of the dial pulse break, and the EP pulse marks the end.

The Clock Generator 361 generates the DPRS, DRCLK, and ADRS CLK signals, which is used for incrementing address counter 362. DRCLK is used to load data into the SC Interface 302 of FIG. 9.

During frames 6 and 12, the Address Counter 362 increments every 324 ns, and during the other frames (1–5, 7–11) it is incremented every 1620 ns. The Clock Generator 361 changes the DPRS, DRCLK and ADRS CLK signals accordingly.

The Address Counter 362 includes a conventional binary counter to generate the channel address used in the signal processor. It is used primarily to address random access memories no other subsystems used in the SP. The Address Counter normally advances from 0–385 on address buses DP1-DP256. A parity generator is used for the signal PAR9, which is the odd parity bit for the 9 address lines. The signal PAR 4 is the odd parity bit for address lines DP1, DP2, DP4 and DP8.

The Path Test Circuit 363 is used to send a channel number to the line group. The line group then inserts a parity error in the data associated with that channel. The data is then routed through the TSI to the terminating line group. This line group senses the parity error and sends the parity error back to the signal processor, which in turn, sends a message to the system controller that a parity error was detected on a certain channel. This action verifies that a path is set up in the TSI. Further details of the path test are described subsequently.

The Power Clear Circuit 395 generates a PWR CLR signal to reset all circuits in the Signal Processor to a known state. The Power Clear Circuit 395 is initiated by an NBL signal from SC Interface 302 of FIG. 10B. The UART oscillator 394 includes a 5 MHz crystal oscillator and divides to generate a 500 KHz and 62.5 KHz signal used by Interface 302 of FIG. 10B.

In FIG. 9, the Framing Error/Parity Error Receiver 304 interfaces to the parity error, framing error, and B2=0 error leads coming from the line group via bus 73. When the Receiver 304 detects 3 parity errors, it sends a message to the SC indicating on which channel number these errors were detected. If the receiver detects 7 consecutive framing or B2=O errors, a message indicating which VB3 is in an alarm condition is set to the system controller.

The Dial Pulse Register/Sender 303 comprises 2 sections, a Dial Pulse register and a Dial Pulse sender.

The Register 305 detects off-hooks, on-hooks, and dialed digits on any one of the 384 channels in a line group. This is accomplished by digitally timing changes of state of the incoming signaling bits. When these changes meet certain time requirements, they are interpreted as status changes of dialed digits. Messages are sent to the SC containing the status change or the digit received and the channel member.

The Sender 306 is capable of sending off-hook, on-hook, and dialed digits on any one of the 384 channels by manipulating the signaling bits sent to the line group. The signal processor receives a message from the system controller containing the status or digit to be output, and the channel number.

A block diagram of the SC interface 302 is shown in FIG. 11. Interface 302 includes conventional universal asynchronous receiver/transmitter (UART), including receiver 391 and transmitter 392.

Inputs to receiver 391 are signals F1, F2, phase 1 ($\phi$1), 500 KHz, 62.5 KHz, and DP1-DP256 from the SC control 301 of FIG. 10. Receiver 391 receives a three byte message from the system controller 50 of FIG. 1 via bus 74-1. Outputs of receiver 391 are 1 byte message on bus 74-2 to the system controller. The signal STAT REQ is a status request signal to the dial pulse register/sender. The 6 ms and 24 ms signals are used by the dial pulse register as will be described subsequently. The PT LOAD signal is utilized by the path test 363 of FIG. 10A. The signals GRP1 and GRP2 are utilized to selectively enable one of four possible dial pulse register/senders and parity error/framing error receivers.

The transmitter 392 uses the same inputs as receiver 391, with the exception of F1, F2 signals. In addition, transmitter 392 has a one byte signal from the system controller via bus 74-3, which corresponds to the bus 74 of FIG. 1. The transmitter 392 has DR CLK signal from control 301 of FIG. 10A and DUMP REQ from appropriate subsystems as will be described. Output of transmitter 392 is a 3 byte message on bus 74-4 to System Controller 50 of FIG. 1. A DUMP EN signal is used by the Parity Error/Framing Error Receiver. PECLR and FECLR signals are applied to the parity error receiver 378 and framing error receiver 371 of FIG. 9, respectively. The NBL signal provides an appropriate initiating signal for the power clear circuit 395.

Data to be loaded into transmitter 392 comes on bidirectional Data 1 - Data 5 lines from the dial pulse register/sender or the parity error/framing error receiver. Data is transmitted out from receiver 391 to the register/sender and parity error/framing error receiver via the Data 1 - Data 5 lines. The Data 1 - Data 5 lines correspond to the 5 bit coded commands as seen in the Chart I.

Assume the System Controller Interface 302 of FIG. 11 receives a message to do a path test on a certain channel. In FIG. 10, as soon as the address counter 362 reaches the channel number specified for the path test, the input signal PT Load from Interface 302 of FIG. 11 goes low into the Path Test Circuit 363. The channel number being output by the Address Counter 362 is now stored. Two additional outputs PTS1, PTS2, as seen in FIG. 14 select one of the four possible Framing Error/Parity Error Receivers and allow the path test data to be sent only to the selected line group and are formed by the GRP1 and 2 signals from Interface 302 of FIG. 11.

In FIG. 14, the PE Reset signal from the Path Test Circuit 363 reinitializes the Parity Error Receivers. The Path Test Circuit 363 will send out the path test data consisting of the channel number to the selected line group as shown in FIG. 5.

The Path Test Circuit 363 includes conventional counter, shift register and logic gates from which the selected channel number is shifted out to the line group 10 of FIG. 5 during the PT CLK signal as seen in FIG. 15. The channel number is sent out for three consecutive frames.

The Path Test Circuit thus is a test signal generator by providing the test signal PT DATA.

The Path Test Circuit is shown in more detail in FIG. 16.

Referring to FIG. 16, the path test circuit 363 of FIG. 10 is shown in more detail. The path test circuit 363 includes a conventional latch 480 which receives addressing on lines DP1-DP256 from address counter 362 in FIG. 10. Latch 480 receives signals GRP 1, 2 from interface 302 of FIG. 11 for forming outputs PTS1, PTS2 to select one of four possible framing error/parity error receivers. Upon receipt of signal PT Load from interface 302, the channel number output by address counter 362 is stored in conventional shift register 478.

Clock generator 477, including conventional four-bit counter and a BCD/decimal decoder, will generate a shift signal to read out the data stored in shift register 478. The output signal PT Data is transmitted to the receiver circuit 304 of FIG. 9 for connecting to the line group of FIG. 2.

The reset control 479 includes conventional flip flops and logic gates for sending out the PT Data signal for three consecutive frames, because the parity error receiver of FIG. 13 will accumulate three parity errors, as will be described subsequently. Once three parity errors have been detected, the path test circuit 363 will receive a DUMP EN signal from the SC interface which will stop the path test.

The path test data will be serially sent out to the input interface of a line group such as shown in FIG. 5 with the proper channel number as the counter sequentially counts to 10, as seen in FIG. 15. The clock signals on PT CLK always occur, and the high output of the PT data is sent to the selected line group. The line group interprets all highs as a nonexistent channel.

Referring now to FIG. 5, the PT data from the Signal Processor on BUS 73-2 is input to the Path Test Gen 156. The Path Test Gen 156 includes a shift register (not shown), a nine-bit buffer 227 for storing the PT Data, and a comparator 228 to compare the data in the buffer with another input, a nine-bit counter 229. Path Test Gen 156 is appropriately clocked by ITG 129. When the inputs to the comparator 228 are equal, its output changes state and is input to an exclusive OR gate 230 via bus 234, which will invert the parity bit for the time slot under test.

The exclusive OR gate has as inputs the comparator output on bus 234 and the parity bit for each time slot in the line group on bus 233. The data with the inverted parity bit is then output on bus 57 to the line driver 143 and TSI Bus 26-1.

The Path Test Gen 156 will invert the parity bit for the PCM data that is being sent through the line group 10 and time slot interchanger 21 for the preselected channel time slot. The PCM data with the inverted parity bit will now be sent out bus 26-1 through the Time Slot Interchanger 21 in FIG. 7 to the T1 Output portion of the I/O Interface of FIG. 6 in the manner already described.

In FIG. 6, the conventional Parity Checker 184 will detect the inverted parity bit during the preselected channel time slot as it is propagated through the T1 Output Interface. The Parity Checker 184 computes parity on the serial word as it is applied to the input of the T1 line driver 181. A parity error condition is loaded into the Parity Muxer 186 for the preselected time slot for which a path test is being conducted. The Parity Muxer 186 sends the parity error data detected to the SP via line driver 188 and buses 187, 73-3.

The T1 Output Interface of FIG. 6 will send the parity error signal to the Parity Error Receiver 378 of the signal processor. In FIG. 12, Parity Error Receiver 378 monitors the PE input from the line group. Every time the line group detects a parity error in the PCM data for a channel, the PE input goes high during that channel time.

The PE receiver 378 includes a 384×3 random access memory 379 and Control Logic 380 for accumulating the parity errors for all channel time slots of an associated line group. As soon as an error is detected during a channel time slot, the Logic 380 stores this signal in Memory 379. This error signal is recirculated in Memory 379 until the occurrence of the next parity error on the channel.

When the Parity Error Receiver 378 has detected 3 parity errors on any one channel, a message containing the channel member is sent to the System Controller.

The next time this channel is addressed, it will be inhibited until reset by an instruction from the system controller.

Referring to FIG. 13, the parity error receiver 378 is shown in more detail. A parity error signal PE is received on Bus 73 from a line group 10 of FIG. 1 and input to conventional quad latch 464. Also input to latch 464 are 3 bits from memory 379, a 3×386 RAM. Outputs of latch 464 are PE IN to AND/OR/INVERT gate 466, which has an input to inverter 467, which forms bit PE1 of Bus 473. The $\overline{\text{PE IN}}$ bit of latch 464 also forms an input to identical gates 466, 468. The $\overline{2Q}$ output of latch 464 is input to NAND gate 465. The 1Q output of latch 464 is input to gate 465, 466, 468 and NAND gate 471. 2Q output of latch 464 is input to gate 468, 471. The $\overline{3Q}$ of output latch 464 is input to gates 470, 471.

Outputs of gates 467, 469 and 470 are bits PE1, PE2, PE3 on bus 473, which are input to memory 379. Memory 379 has address inputs 0–385, PE CLR from the SC interface 302, and $\phi 1$ from Control 301 of FIG. 10. $\phi 1$ is also input to latch 464. Gate 470 has a PE DUMP EN signal from the SC interface 302.

The operation of the PE receiver 378 is as follows: Receiver 378 monitors the PE input of bus 73 from line group 10 of FIG. 1. Every time a line group 10 detects a parity error in the PCM data for a channel, the PE signal on bus 73 goes into latch 464 during the time slot in which the parity error is detected.

When the receiver 378 has detected three parity errors on any one channel, a message containing the channel number is sent to system controller interface via bus 474, which in turn is set to system controller 50 of FIG. 1.

When the parity error signal PE is input to latch 464, it will be stored in memory 379 at the address associated with the time slot in which the parity error occurred. This parity error continues to recirculate through memory 379 until the occurrence of the next parity error on this channel time slot. When the second error occurs, the control logic of receiver 378 will indicate a parity error for bit PE2 of bus 473. This data is stored in memory 379 until the next occurrence of a parity error on this channel. When a third error occurs for this channel, the logic will indicate an error on bit PE3 of bus 473 which is stored in memory 379. At the next occurrence of this channel time, output gate 471 will initiate a PE DUMP REQ on bus 474. The system controller interface 302 will acknowledge the dump request with a DUMP EN signal to gate 470, which will inhibit any further dump request for this channel until the memory 379 is reset via input PE CLR.

The path test scheme as described above may be utilized for testing the continuity of a path established between the various subsystems of the integrated message accounting system. For example, a path between the Time Slot Interchanger 21 and MF Receiver 17 of FIG. 1, as described in the call processing overview, may be tested in accordance with the description of the present invention.

What is claimed is:

1. In a telephone system having an interface including an input portion connecting to an input line for receiving input telephone signals and having an output portion connected to an output line for transmitting output signals in time frames each consisting of a plurality of time slots, test apparatus comprising:

test signal generator means, connected to said input portion, for connecting a test signal to a selected one of said time slots whereby said test signal occurs in said selected time slot in said input portion, said test generator means including means for sending a plurality of said test signals in the same time slot in successive time frames, control means connected to said test generator means for specifying said selected time slot, means for connecting a data path between said input portion and said output portion whereby said test signal occurs in a corresponding time slot in said successive time frames in said output portion, and means for detecting said test signal occurring in said corresponding time slot in said output portion, said means for detecting including means for receiving said plurality of test signals in said successive time frames in said corresponding time slot including memory means for storing a control count from an initial count to a predetermined count corresponding to the successive test signals for each of said time slots and logic means connected to receive said sequential test signals in said successive time frames in said specified time slots for incrementing said control count from said initial count to said predetermined count whereby said logic means generates a control signal when said count reaches said predetermined count thereby verifying the continuity of said path between said input portion and said output portion.

2. A system as in claim 1 wherein said input portion includes parity bit generator means for adding a parity bit to the data in each time slot, said test signal generator means further including parity bit inverting means connected to receive said parity bit for inverting said parity bit in response to said test signal, and said means for detecting said test signal including parity checker means for checking the parity for each of said time slots whereby said parity checker forms a parity error signal.

3. A system as in claim 2 wherein said test signal generator means includes buffer means connected to receive said test signal,
    counter means for counting from an initial count to a predetermined count corresponding to the number of said time slots in a time frame,
    comparator means, connected to receive said test signal and said count, for outputting another test signal when said count and said test signal are equal,
    and parity bit inverter means, connected to receive said parity bit and said another test signal, for inverting said parity bit in response to said another test signal.

4. A system as in claim 3 wherein said inverter means include an exclusive OR gate.

5. A system as in claim 4 wherein said test generator means include means for sending a plurality of test signals in successive frames whereby a corresponding number of said parity error signals are formed and further including parity error receiver means, connected to said detecting means, for receiving said corresponding number of parity error signals thereby verifying the continuity of said data path.

6. A system as in claim 1 wherein said control means includes address counter means for counting from an initial count to a predetermined count for addressing said test signal generator means during said selected time slot whereby said generator means stores said selected count.

7. A system as in claim 6 wherein said generator means includes shift register means for storing said selected count and counter means for reading out sequentially each time frame to said input portion said test signal corresponding to said selected time slot.

8. In a telphone system having an interface including an input portion for receiving input telephone signals and having an output portion connected to an output line for transmitting output signals, said telephone system operating with the telephone signals in time frames each consisting of a plurality of time slots, a method for testing the continuity of one or more data paths between said input and output portions during successive time frames comprising the steps of:
    connecting a test signal to a selected one of said time slots in succesive time frames whereby said test signal occurs in said selected time slot in said input portion in said successive time frames,
    specifying said selected time slot,
    connecting a data path between said input portion and said output portion whereby said test signal occurs in a corresponding time slot in said successive time frames in said output portion,
    detecting said test signal occurring in said corresponding time slot in said successive time frames in said output portion, storing a control count from an initial count to a predetermined count corresponding to the successive test signals for each of the time slots, incrementing said control count each time frame from said initial count to said predetermined count and generating a control signal when said count reaches said predetermined count thereby verifying the continuity of said path between said input portion and said output portion.

9. In a telephone system having an interface including an input portion connected to an input line for receiving input telephone signals and having an output portion connected to an output line for transmitting output signals in time frames each consisting of a plurality of time slots, test apparatus comprising:
    test signal generator means connected to said input portion for connecting a test signal to a selected one of said time slots whereby said test signal occurs in said selected time slot in said input portion, said test generator means including means for sending a plurality of said test signals in the same time slot in successive time frame,
    control means connected to said test signal generator means for specifying said selected time slots, said control means including address counter means for counting from an initial count to a predetermined count for addressing said test signal generator means during said selected time slots whereby said generator means stores said selected count, said generator means including shift register means for storing said selected count and counter means for reading out sequentially each time frame to said input portion said test signal corresponding to said selected time slot, said counter means including clock generator means for reading out said test signal from said shift register means in said successive time frames and logic means for stopping the sending of said test signals when said plurality of test signals have been sent,
    means for connecting a data path between said input portion and said output portion whereby said test signal occurs in a corresponding time slot in said successive time frames in said output portion, and
    means for detecting said test signal occurring in said corresponding time slot in said output portion, said means for detecting including means for receiving said plurality of test signals in said successive time frames in said corresponding time slot thereby verifying continuity of said path between said input portion and said output portion.

10. A system as in claim 9 wherein said means for detecting include memory means for storing a control count from an initial count to a predetermined count corresponding to said plurality of test signals for each of said time slots, and
    logic means connected to receive said plurality of test signals in successive time frames in said specified time slot for incrementing said control count from said initial count to said predetermined count whereby said logic means generates a control signal when said count reaches said predetermined count thereby verifying the continuity of said path.

11. A system as in claim 10 wherein said successive time frames include three time frames.

12. In a telephone system having an interface including an input portion connected to an input line for receiving input telephone signals and having an output portion connected to an output line for transmitting output signals, said system operating with the telephone signals in time frames each consisting of a plurality of time slots, test apparatus comprising:
    test signal generator means, connected to said input portion, for connecting a test signal to a selected one of said time slots whereby said test signal occurs in said selected time slot in said input portion, said test generator means including means for sending a plurality of said test signals in three successive time frames in said selected time slot,
    control means, connected to said test signal generator means, for specifying said selected time slot, means for connecting a data path between said input portion and said output portion whereby said test signals occur in a time slot corresponding to said selected time slot in three successive time frames in said output portion, means for detecting said test signal occuring in the corresponding time slot in said output portion, said means for detecting including means for receiving said plurality of test signals in said three successive frames in said corresponding time slot including memory means for storing a control count from an initial count to a predetermined count corresponding to the three test signals for each of said time slots and logic means connected to receive said sequential test signals in said three successive time frames in said specified time slot for incrementing said control count from said initial count to said predetermined count whereby said logic means generates a control signal when said count reaches said predetermined count thereby verifying the continuity of said path.

* * * * *